US011775799B2

(12) United States Patent
Mappouras et al.

(10) Patent No.: US 11,775,799 B2
(45) Date of Patent: Oct. 3, 2023

(54) RUNTIME EXTENSION FOR NEURAL NETWORK TRAINING WITH HETEROGENEOUS MEMORY

(71) Applicant: Advanced Micro Devices, Inc., Santa Clara, CA (US)

(72) Inventors: Georgios Mappouras, Durham, NC (US); Amin Farmahini-Farahani, Santa Clara, CA (US); Sudhanva Gurumurthi, Austin, TX (US); Abhinav Vishnu, Austin, TX (US); Gabriel H. Loh, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 1034 days.

(21) Appl. No.: 16/194,958

(22) Filed: Nov. 19, 2018

(65) Prior Publication Data

US 2020/0042859 A1 Feb. 6, 2020

Related U.S. Application Data

(60) Provisional application No. 62/713,603, filed on Aug. 2, 2018.

(51) Int. Cl.
*G06N 20/10* (2019.01)
*G06N 3/04* (2023.01)
(Continued)

(52) U.S. Cl.
CPC ........... *G06N 3/04* (2013.01); *G06F 9/44505* (2013.01); *G06F 9/544* (2013.01); *G06N 3/084* (2013.01)

(58) Field of Classification Search
CPC ........ G06N 3/04; G06N 3/084; G06N 3/0445; G06N 3/0454; G06N 3/0481; G06F 9/44505; G06F 9/544
See application file for complete search history.

(56) References Cited

U.S. PATENT DOCUMENTS 5,657,420 A 8/1997 Jacobs et al.
6,067,287 A 5/2000 Chung-Ju et al.
(Continued)

FOREIGN PATENT DOCUMENTS

EP 3098762 A1 11/2016
WO 2017003887 A1 1/2017

OTHER PUBLICATIONS

Minsoo Rhu et al. vDNN: Virtualized Deep Neural Networks for Scalable, Memory-Efficient Neural Network Design (Year: 2016).*
(Continued)

*Primary Examiner* — Kevin L Young
*Assistant Examiner* — Abdou K Seye
(74) *Attorney, Agent, or Firm* — KOWERT HOOD MUNYON RANKIN AND GOETZEL PC; Rory D. Rankin

(57) ABSTRACT

Systems, apparatuses, and methods for managing buffers in a neural network implementation with heterogeneous memory are disclosed. A system includes a neural network coupled to a first memory and a second memory. The first memory is a relatively low-capacity, high-bandwidth memory while the second memory is a relatively high-capacity, low-bandwidth memory. During a forward propagation pass of the neural network, a run-time manager monitors the usage of the buffers for the various layers of the neural network. During a backward propagation pass of the neural network, the run-time manager determines how to move the buffers between the first and second memories based on the monitored buffer usage during the forward propagation pass. As a result, the run-time manager is able to reduce memory access latency for the layers of the neural network during the backward propagation pass.

20 Claims, 17 Drawing Sheets

(51) Int. Cl.

| | |
|---|---|
| ***G06F 9/54*** | (2006.01) |
| ***G06F 9/445*** | (2018.01) |
| ***G06N 3/084*** | (2023.01) |

(56) References Cited

U.S. PATENT DOCUMENTS

| | | | |
|---|---|---|---|
| 8,131,660 | B2 | 3/2012 | Davis et al. |
| 8,369,595 | B1 | 2/2013 | Derakhshani et al. |
| 9,319,137 | B2 | 4/2016 | Zhuge et al. |
| 10,078,794 | B2 | 9/2018 | Pierce et al. |
| 10,762,392 | B2 | 9/2020 | Zhang et al. |
| 2015/0178246 | A1 | 6/2015 | Herrero Abellanas et al. |
| 2015/0358755 | A1 | 12/2015 | Luo et al. |
| 2016/0062294 | A1 | 3/2016 | Murashima |
| 2016/0179434 | A1 | 6/2016 | Herrero Abellanas et al. |
| 2017/0316312 | A1 | 11/2017 | Goyal et al. |
| 2018/0032859 | A1 | 2/2018 | Park et al. |
| 2018/0189641 | A1 | 7/2018 | Boesch et al. |
| 2018/0218303 | A1 | 8/2018 | Cole et al. |
| 2018/0322606 | A1* | 11/2018 | Das ........................... G06T 1/20 |
| 2019/0028752 | A1 | 1/2019 | Zhang et al. |
| 2019/0087708 | A1* | 3/2019 | Goulding ............... G06N 3/082 |
| 2019/0147332 | A1 | 5/2019 | Lagudu et al. |
| 2019/0147342 | A1* | 5/2019 | Goulding ............... G06N 3/045 706/25 |
| 2019/0266476 | A1* | 8/2019 | Schorn ................... G06N 3/063 |
| 2019/0303143 | A1* | 10/2019 | Beard ................... G06F 9/3877 |
| 2019/0325305 | A1 | 10/2019 | Zhang et al. |
| 2020/0134432 | A1 | 4/2020 | Lagudu et al. |
| 2020/0302285 | A1 | 9/2020 | Wang et al. |

OTHER PUBLICATIONS

Sumeet S. Kumar et al. "Low Overhead Message Passing for High Performance Many-Core Processors". (Year: 2013).*

Non-Final Office Action in U.S. Appl. No. 15/657,613, dated Oct. 5, 2018, 12 pages.

Final Office Action in U.S. Appl. No. 15/657,613, dated Mar. 8, 2019, 10 pages.

International Search Report and Written Opinion in International Application No. PCT/US2018/052358, dated Feb. 18, 2019, 13 pages.

Cecconi et al., "Optimal Tiling Strategy for Memory Bandwidth Reduction for CNNs", International Conference on Advanced Concepts for Intelligent Vision Systems, Sep. 18, 2017, pp. 89-100.

Fan et al., "F-C3D: FPGA-based 3-Dimensional Convolutional Neural Network", 27th International Conference on Field Programmable Logic and Applications (FPL), Sep. 4, 2017, 4 pages.

Rahman et al., "Efficient FPGA Acceleration of Convolutional Neural Networks Using Logical-3D Compute Array", Proceedings of the 2016 Conference on Design, Automation Test in Europe, Mar. 14, 2016, pp. 1393-1398.

Notice of Allowance in U.S. Appl. No. 16/234,956, dated May 5, 2020, 10 pages.

Chetlur et al., "cuDNN: Efficient Primitives for Deep Learning", arXiv:1410.0759v3 [cs.NE], NVIDIA, Santa Clara, CA, Dec. 18, 2014, 9 pages, https://arxiv.org/pdf/1410.0759v3.pdf. [Retrieved Sep. 27, 2021].

Han et al.,"EIE: Efficient Inference Engine on Compressed Deep Neural Network", 2016 ACM/IEEE 43rd Annual International Symposium on Computer Architecture (ISCA), IEEE, Jun. 18, 2016, pp. 243-254.

Rhu et al., "vDNN: Virtualized Deep Neural Networks for Scalable, Memory-Efficient Neural Network Design", The 49th Annual IEEE/ACM International Symposium on Microarchitecture, arXiv:1602.08124v3 [cs.DC], NVIDIA, Santa Clara, CA, Jul. 28, 2016, 13 pages, https://arxiv.org/pdf/1602.08124.pdf. [Retrieved Sep. 27, 2021].

Wang et al., "SuperNeurons: Dynamic GPU Memory Management for Training Deep Neural Networks", arXiv:1801.04380v1 [cs.DC], Jan. 13, 2018, 13 pages, https://arxiv.org/pdf/1801.04380.pdf. [Retrieved Sep. 27, 2021].

Chen et al., "Profile-guided Proactive Garbage Collection for Locality Optimization", PLDI'06, Jun. 10-16, 2006, Ottawa, Ontario, Canada, pp. 332-340, https://safari.ethz.ch/architecture/fall2017/lib/exe/fetch.php?media=p332-chen.pdf. [Retrieved Sep. 27, 2021].

Meng et al., "Training Deeper Models by GPU Memory Optimization on TensorFlow", 31st Conference on Neural Information Processing Systems (NIPS 2017), Long Beach, CA, 8 pages, http://learningsys.org/nips17/assets/papers/paper_18.pdf. [Retrieved Sep. 27, 2021].

Chen et al., "moDNN: Memory Optimal DNN Training on GPUs", 2018 Design, Automation & Test in Europe Conference & Exhibition, Mar. 19-23, 2018, pp. 13-18, https://past.date-conference.com/proceedings-archive/2018/pdf/0450.pdf. [Retrieved Sep. 27, 2021].

He et al., "Deep Residual Learning for Image Recognition", arXiv preprint arXiv:1512.03385, Microsoft Research, Dec. 10, 2015, 12 pages, https://arxiv.org/pdf/1512.03385v1.pdf. [Retrieved Sep. 27, 2021].

Rhu et al., "Compressing DMA Engine: Leveraging Activation Sparsity for Training Deep Neural Networks", POSTECH, NVIDIA, 2018, 14 pages, https://www.cs.utexas.edu/~skeckler/pubs/HPCA_2018_CDMA.pdf. [Retrieved Sep. 28, 2021].

* cited by examiner

300

```
RENTInit();                        //Initializing RENT
/*Allocating buffers*/
GPUMalloc(weights);                //Managed by Base-Runtime
GPUMalloc(gradients);              //Managed by Base-Runtime
RENTMalloc(activations);           //Managed by RENT


while (condition) {                //Epochs
  /*Training DNN*/
  for (i=1; i<iterations; i++) {   //Iterations per epoch
    RENTFP();                      //Triggers RENT FP data management
    ForwardPropagation();          //Performing FP
    RENTBP();                      //Triggers RENT BP data management
    BackwardPropagation();         //Performing BP
  }
  /*Testing DNN*/
  RENTFP();                        //Triggers RENT FP data management
  ForwardPropagation();            //Performing FP
  Update(condition);
}
```

FIG. 3

RUNTIME EXTENSION FOR NEURAL NETWORK TRAINING WITH HETEROGENEOUS MEMORY

CROSS REFERENCE TO RELATED APPLICATIONS

This application claims priority to Provisional Patent Application Ser. No. 62/713,603, entitled "Runtime Extension for Neural Network Training on GPUs with Heterogeneous Memory", filed Aug. 2, 2018, the entirety of which is incorporated herein by reference.

This invention was made with Government support under the PathForward Project with Lawrence Livermore National Security, Prime Contract No. DE-AC52-07NA27344, Subcontract No. B620717 awarded by the United States Department of Energy. The United States Government has certain rights in this invention.

BACKGROUND

Description of the Related Art

An emerging technology field is machine learning, with a neural network being one type of a machine learning model. Neural networks have demonstrated excellent performance at tasks such as hand-written digit classification and face detection. Additionally, neural networks have also shown promise for performing well in other, more challenging, visual classification tasks. Other applications for neural networks include speech recognition, language modeling, sentiment analysis, text prediction, and others.

During supervised training, a neural network is given inputs that have already been classified. Based on the inputs, the layers of the neural network generate activations that propagate from one layer to the next. This is called forward propagation. At the end of a forward propagation iteration, the neural network makes a prediction about the input and how it should be classified. The neural network's prediction is then compared with the already known, correct classification decision. If the prediction differs from the correct outcome, an error is calculated and propagated from the last layer of the neural network back to the first layer in the form of gradients. The gradients in turn are used to update the weights of the layers. This process is called backward propagation and this type of training is based on the gradient descent algorithm. With each forward-backward propagation iteration, each layer updates its weights to improve the overall accuracy of the neural network.

Each forward-backward propagation iteration uses significant amounts of processing and memory resources of a host computing system. Device memory bandwidth is a key bottleneck for neural network training on many types of processing units. To efficiently train neural networks and achieve high processing element utilization, the memory subsystem needs to constantly feed data to large numbers of processing elements. Additionally, some computing systems have a heterogeneous memory architecture with different types of memory devices with varying access latencies and capacities. Accordingly, training a neural network in an efficient manner on a computing system with a heterogeneous memory architecture can be challenging.

BRIEF DESCRIPTION OF THE DRAWINGS

The advantages of the methods and mechanisms described herein may be better understood by referring to the following description in conjunction with the accompanying drawings, in which:

FIG. 3 illustrates one example of pseudocode for embedding RENT application programming interfaces (APIs) in the framework code in accordance with one implementation.

DETAILED DESCRIPTION OF IMPLEMENTATIONS

Figure 1:
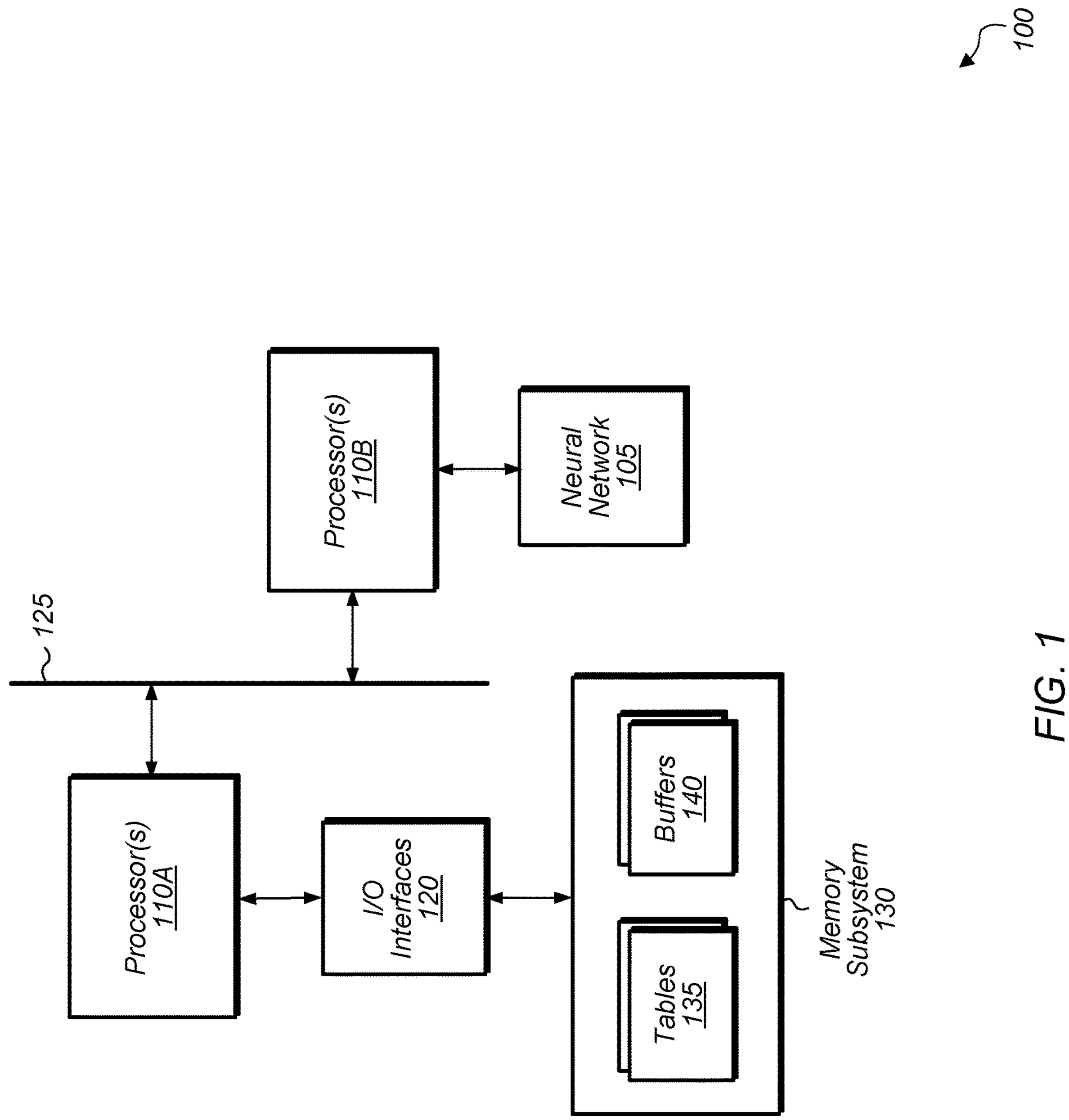
FIG. 1 is a block diagram of one implementation of a computing system.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for implementing a neural network in a heterogeneous memory architecture environment are disclosed herein. In one implementation, a neural network has non-complex, predetermined producer-consumer relations between layers. In this implementation, the layers of the neural network are executed in a particular order while the output of one layer is used as an input to a next layer. Additionally, after a layer consumes its input buffer during a forward propagation iteration, that buffer is typically not used again until the following backward propagation iteration.

In one implementation, a system includes at least a processing unit for implementing a neural network coupled to a first memory and a second memory. The first memory is a relatively low capacity, high bandwidth memory and the second memory is a relatively high capacity, low bandwidth memory. Typically, when implementing the neural network on the processing unit, the first memory does not have the capacity to store all of the activation buffers utilized by the different layers of the neural network. It is noted that the processing unit can also be referred to more generally as a collection of processing resources or processing elements herein. When the neural network is reading or writing to activation buffers in the second memory, the performance of the neural network is negatively impacted. To mitigate this performance degradation, a runtime manager is executed to intelligently manage the movement of activation buffers between the first and second memories.

In one implementation, the runtime manager executes on a second processing unit distinct from the first processing unit which implements the neural network. In one implementation, the second processing unit executes instructions which specify which activation buffers should be managed by the runtime manager. In one implementation, the runtime manager populates a plurality of tables with entries specifying the usage of activation buffers during a forward propagation pass through the neural network. The runtime manager monitors the usage of activation buffers by the different layers of the neural network and causes the activation buffers to be copied between the first and second memories based on the usage pattern. During a backward propagation pass, the runtime manager uses the tables, populated during the forward propagation pass, to determine how to move activation buffers in between the first and second memories.

In one implementation, the neural network is executed on a graphics processing unit (GPU). In this implementation, the runtime manager records the order in which different GPU kernels and their respective input and output buffers are launched for execution during forward propagation. In one implementation, each GPU kernel executes a given layer of the neural network. For every GPU kernel, the runtime manager ensures that its output buffer is allocated in the first memory. Because the output of a layer is used as an input to a next layer, this leads to all layers having both their input and output buffers allocated in the first memory. However, the capacity of the first memory will eventually become fully allocated as more GPU kernels are executed. In one implementation, to ensure that all layers can utilize the first memory for their input and output buffers, the runtime manager proactively transfers data from the first memory to the second memory and reclaims first memory capacity when more capacity is needed by the GPU kernels. In one implementation, the runtime manager initiates data transfer between the first memory and the second memory even in the middle of kernel execution since the runtime manager decouples the data transfer from the kernel execution.

Referring now to FIG. 1, a block diagram of one implementation of a computing system 100 is shown. In one implementation, computing system 100 includes at least neural network 105, processor(s) 110A-B, input/output (I/O) interfaces 120, bus 125, and memory subsystem 130. In other implementations, computing system 100 can include other components and/or computing system 100 can be arranged differently. In one implementation, memory subsystem 130 includes at least two different types of memory. For example, in one implementation, memory subsystem 130 includes a high-bandwidth memory (HBM) and a non-volatile memory (NVM). In other implementations, memory subsystem 130 includes other numbers and types of memories. Throughout this disclosure, when the discussion refers to HBM and NVM, it should be understood that these are examples of two different types of memory devices that are employed in one particular implementation. Accordingly, the HBM and NVM can also be referred to more generally as “first” and “second” memory devices, respectively.

In various implementations, neural network 105 includes logic for implementing any of various machine learning algorithms or machine learning models. In one implementation, neural network 105 implements one or more layers of a convolutional neural network. For example, in this implementation, neural network 105 implements one or more convolutional layers and/or one or more fully connected layers. In another implementation, neural network 105 implements one or more layers of a recurrent neural network. In various implementations, neural network 105 is trained using a backward propagation algorithm via stochastic gradient-descent (SGD). In one implementation, the logic of neural network 105 includes a plurality of multiplier-accumulator (MAC) units, peripherals, and internal memory storage. In one implementation, the peripherals include a memory interface, a direct memory access (DMA) engine, and a microprocessor. Depending on the implementation, any of various software deep learning frameworks (e.g., Caffe, TensorFlow, Torch) are used for training neural network 105 on a particular processing unit (e.g., graphics processing unit (GPU)).

Table(s) 135 include any number of tables for tracking the pattern of activation buffer usage by neural network 105. For example, in one implementation, table(s) 135 include a push table, a pop table, and an order table. In other implementations, tables 135 include other numbers and types of tables. While table(s) 135 are shown as being located within memory subsystem 130, it should be understood that this is indicative of one particular implementation. In other implementations, table(s) 135 are stored in other locations (e.g., one or more caches) in system 100. Buffer(s) 140 are representative of any number and type of buffers stored in memory subsystem 130 which are utilized by neural network 105.

In one implementation, to record the order of executed kernels and their input and output buffers and enable efficient data transfer in the heterogeneous memory, neural network 105 uses three tables 135. In this implementation, these three tables 135 are a push table, a pop table, and an order table. In other implementations, neural network 105 uses other numbers and/or types of tables. The push-table maintains the order that buffers should be transferred (i.e., pushed) from HBM to NVM during forward propagation. To achieve this ordering, the push table is filled with entries based on the kernels and their input and output buffers that are observed during the forward propagation as follows: 1—An entry is added for every input buffer that is not also used as an output by the same kernel. 2—An entry is added for every output buffer that is neither observed as an input or an output in the next kernel execution. 3—Existing entries are not added again.

In one implementation, the push-table has 2 columns per entry. One column stores the buffer ID and the other columns stores the status of each entry (i.e., whether the transfer is complete). The status of each entry is referred to herein as a C-bit. The status of an entry is equal to zero if the respective buffer has not yet been copied (step 1 of the transfer procedure) and equal to one if it has already been copied. An entry is removed from the push table when the transfer of the respective buffer to the NVM has completed and its respective allocation from the HBM has been freed (step 2 of the transfer procedure). During forward propagation, a runtime manager executing on processor(s) 105 picks the oldest entry from the push-table having its C-bit=0 to initiate a new buffer transfer. Once the transfer completes, the runtime manager picks the next entry from the push-table without synchronizing with the executing kernels/layers. When the HBM-pool is fully allocated, the runtime manager selects all of the entries with C-bit=1, frees their allocation in the HBM-pool, and removes them from the push-table.

In one implementation, the order-table maintains the order that buffers can be removed from the HBM during the forward propagation execution when the buffers are not used anymore for the current forward propagation iteration. The goal of this procedure is to help the runtime manager free HBM-pool capacity so that buffers can start transferring from NVM back to HBM. The order-table records the order that buffers are initially observed during forward propagation as follows: 1—An entry is added for every output buffer that is observed. 2—Existing entries are not added again. In one implementation, the order-buffer is filled with entries during forward propagation but used during the backward propagation. During the backward propagation, the last entry of the order-table is selected and marked as a candidate buffer to be removed from the HBM. The candidate buffer is only removed from the HBM in the next kernel execution if the candidate buffer is not observed as an input buffer to that kernel. When a buffer is removed from the HBM the respective entry is also removed from the order-table.

In one implementation, the pop-table maintains the order that buffers should be transferred (i.e., popped) from NVM back to HBM during backward propagation. It is noted that in one implementation, the pop-table is filled with entries during forward propagation but used during backward propagation. An entry is added to the pop-table as follows: 1—An entry is added for every input buffer that is observed. 2—Existing entries update their position in the table to maintain a least recently used (LRU)-like order of the buffers. When a buffer is removed from the HBM based on the order-table, the runtime manager selects the last entry in the pop-table. If there is enough HBM-pool capacity, the runtime manager transfers the respective buffer from NVM to HBM. When the transfer completes, the entry in the pop-table is removed, and the next entry in the pop-table is selected, independently and asynchronously with the executing kernels/layers. It is noted that in one implementation, the pop-table does not have a status column (C) as the NVM allocations are not removed but rather reused in the next forward propagation iteration.

Neural network 105 is utilized in a variety of different applications which vary according to the implementation. For example, in one implementation, neural network 105 analyzes a video frame to generate one or more label probabilities for the video frame. For example, potential use cases include at least eye tracking, object recognition, point cloud estimation, ray tracing, light field modeling, depth tracking, and others. For eye tracking use cases, probabilities generated by neural network 105 are based on learned patterns, dwell, transition angles, blink, etc. In other implementations, neural network 105 is trained and customized for other types of use cases.

Processors(s) 110A-B are representative of any number and type of processing units (e.g., central processing unit (CPU), graphics processing unit (GPU), digital signal processor (DSP), field programmable gate array (FPGA), application specific integrated circuit (ASIC)). In one implementation, some of the processing associated with neural network 105 is performed by processor(s) 110B. Additionally, neural network 105 is implemented using any of these types of processing units and/or other types of processing elements. Memory subsystem 130 includes any number and type of memory devices. For example, the type of memory in memory subsystem 130 can include high-bandwidth memory (HBM), non-volatile memory (NVM), Dynamic Random Access Memory (DRAM), Static Random Access Memory (SRAM), NAND Flash memory, NOR flash memory, Ferroelectric Random Access Memory (FeRAM), or others. Memory subsystem 130 is accessible by neural network 105 and processor(s) 110A-B. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
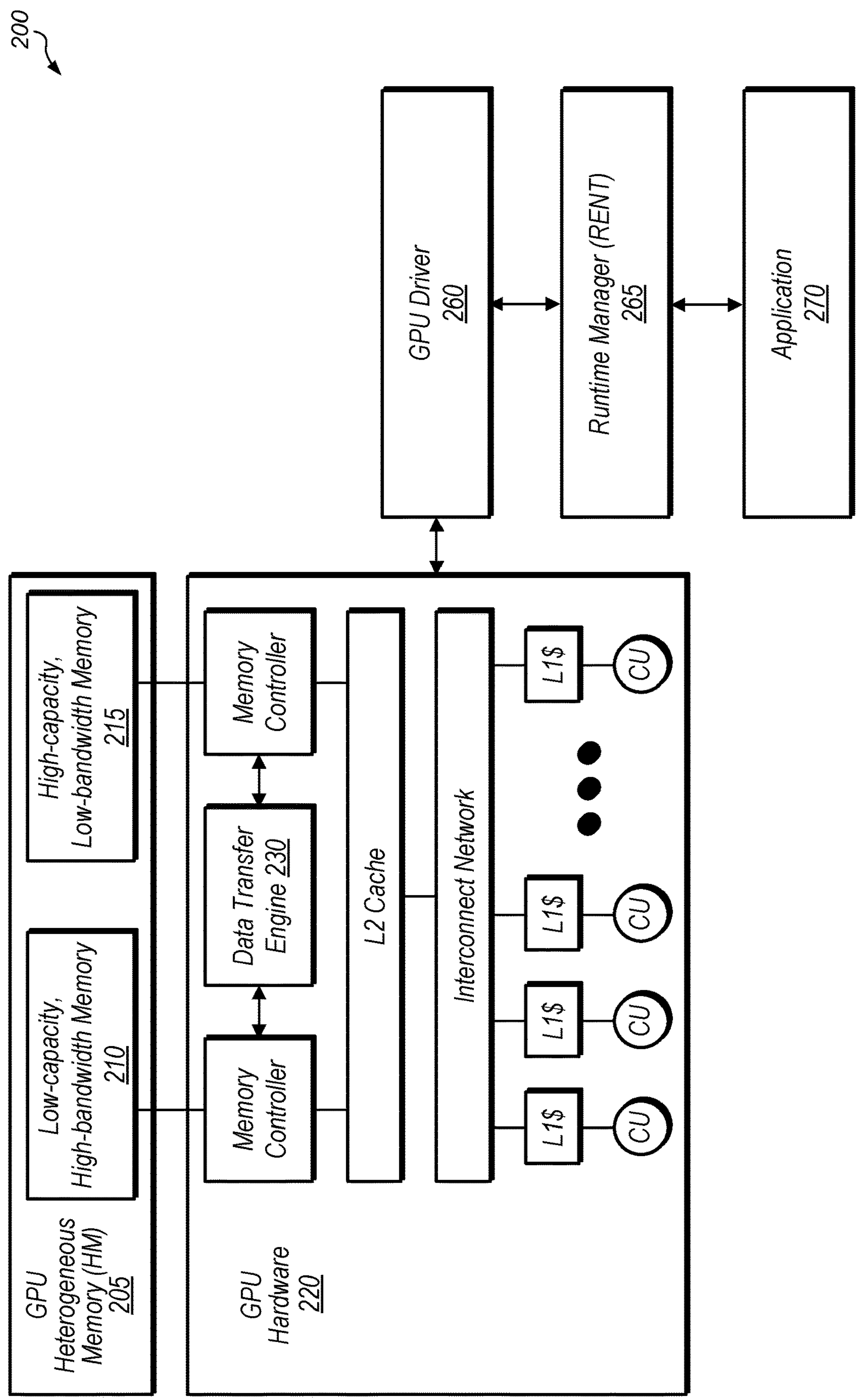
FIG. 2 is a block diagram of one implementation of a graphics processing unit (GPU) runtime system.

Turning now to FIG. 2, a block diagram of one implementation of a GPU runtime system 200 is shown. In one implementation, GPU runtime system 200 includes heterogeneous memory (HM) 205, GPU hardware 220, GPU driver 260, runtime manager 265, and application 270. It is noted that runtime manager 265 can also be referred to herein as a runtime extension for neural network training (RENT). In one implementation, application 270 is an inference task. In another implementation, application 270 is a classification task. In other implementations, application 270 is other types of applications.

In one implementation, HM 205 includes low-capacity, high-bandwidth memory 210 and high-capacity, low-bandwidth memory 215. In one implementation, memory 210 is a high-bandwidth memory (HBM) and memory 215 is a non-volatile memory (NVM). In other implementations, HM 205 includes other numbers and/or types of memory. In one implementation, GPU hardware 220 includes a memory controller for each memory device of HM 205 and a data transfer engine 230 to transfer data between the memory devices of HM 205. GPU hardware 220 also includes a level two (L2) cache, an interconnect network, and a plurality of level one (L1) caches coupled to a plurality of compute units (CUs).

In various implementations, RENT 265 orchestrates the transfer of data within the HM 205 so that neural network training maintains high performance. RENT 265 abstracts the HM 205 and provides the user with a unified memory with both high capacity and high bandwidth. To achieve this, RENT 265 records the order that different GPU kernels, and their respective input and output buffers, are launched for execution during forward propagation. For every kernel, RENT 265 ensures that its output buffer is allocated to the HBM. It is noted that because output buffers are only written, RENT 265 can allocate them to HBM without performing any data transfer. Additionally, because the output of one layer is used as an input to a next layer, this process will lead to all the layers having both their input and output buffers allocated in the HBM. However, as this process continues, the HBM capacity will be fully allocated.

To ensure that all the layers can utilize the HBM, RENT 265 uses the same recorded order of buffers to decide when and which buffer should be transferred from the HBM to the NVM during forward propagation. This transfer is performed in parallel to the execution of the kernels. Thus, RENT 265 maintains enough free HBM capacity for the execution of future kernels. It is noted that RENT 265 does not use any information from the particular neural network framework to make data transfer decisions. Thus, RENT 265 initiates data transfer between HBM and NVM even in the middle of a kernel's execution.

In order to avoid data inconsistencies, RENT 265 uses a simple but effective method to avoid such synchronizations. Every buffer transfer is performed in two independent steps. The first step is to create a copy of the buffer in the desired destination (e.g., in the NVM). The second step is to free the previous allocation (e.g., HBM allocation) of the respective buffer. In one implementation, while RENT 265 continuously performs the first step for different buffers, it only performs the second step when the HBM capacity is fully allocated. Thus, RENT 265 can perform the second step for multiple buffers at the same time and avoid synchronization between the data transfers and the executing kernels. Furthermore, RENT 265 uses the recorded order of buffers captured during forward propagation to extrapolate the order that the buffers will be used during backward propagation. Thus, during backward propagation, RENT 265 initiates buffer transfers from NVM back to HBM so that each kernel's data will be located in the HBM before kernel execution.

In one implementation, RENT 265 is designed as an extension to the existing GPU runtime system. Typically, runtime managers are responsible for managing buffer allocations and maintaining the buffers' physical mappings, not only in the GPU memory (e.g., HBM) but also in the host CPU's memory because a single buffer can have both host and device memory allocations at the same time. Thus, the runtime manager keeps track of both allocations and can perform data transfer between the two memories. During the execution of a GPU kernel, the runtime manager 265 decides which memory allocation should be used for each input and output buffer.

In one implementation, GPU hardware 220 includes data transfer engine 230 that allows RENT 265 to initiate data transfers between the HBM 210 and NVM 215 without the involvement of the GPU's compute units (CUs) or the host CPU. It is noted that data transfer engine 230 can also be referred to herein as a "buffer transfer engine". In various implementations, the data transfer engine 230 is implemented as a modification to an existing DMA engine or the data transfer engine 230 is implemented as a separate engine. Data transfer engine 230 is implemented using any suitable combination of hardware and/or software. In one implementation, data transfer engine 230 receives commands from RENT 265 to transfer buffers between HBM 210 and NVM 215.

Referring now to FIG. 3, one example of pseudocode 300 for embedding RENT application programming interfaces (APIs) in the framework code is shown. In one implementation, four RENT-specific GPU APIs are embedded in pseudocode 300 to enable RENT buffer management. A first API is used at the start of the framework pseudocode 300 to initiate RENT (RENTInit), one before each forward propagation execution (RENTFP), and one before each backward propagation execution (RENTBP). Note that in some implementations RENTFP and RENTBP are only used once in every training iteration, independently of the number of layers in the deep neural network (DNN). These APIs have a dual purpose. First, they allow RENT to differentiate between forward propagation and backward propagation passes and thus initiate a different data management scheme. Additionally, the user has the freedom to choose (by including or excluding these APIs) when the data management should be initiated. For example, transferring data in a heterogeneous memory subsystem may not be desired for small DNN models or other type of applications.

The fourth RENT API is a memory allocation command that is referred to as "RENTMalloc( )" (similar to hipMalloc( ) and cudaMalloc( )). RENTMalloc( ) allows the runtime manager to identify which buffers will be automatically managed and transferred through RENT. By using this special allocation command, the user (through the framework) has the freedom to specify which buffers should be dynamically transferred between NVM and HBM. This process allows for a more efficient data management scheme as some buffers (i.e., activation buffers) allocate significantly more capacity than others. It is noted that "activation buffers" can also be referred to herein as "feature maps".

In one implementation, when RENTMalloc( ) is called, RENT allocates the remaining free HBM capacity (not used for weights, workspace, etc.) as a memory pool for activation buffers. This memory pool is referred to herein as the HBM pool. However, in one implementation, RENT does not actually dedicate any physical memory space for these buffers until the buffers are about to be used by the GPU. Instead, RENT records the required capacity size for each buffer. When the training initiates, RENT automatically manages HBM and NVM data and moves activation buffers in and out of the HBM pool during each forward propagation iteration and backward propagation iteration. By doing this, a memory pool is allocated for activations once, but the memory pool is reused multiple times during training.

Figure 4:
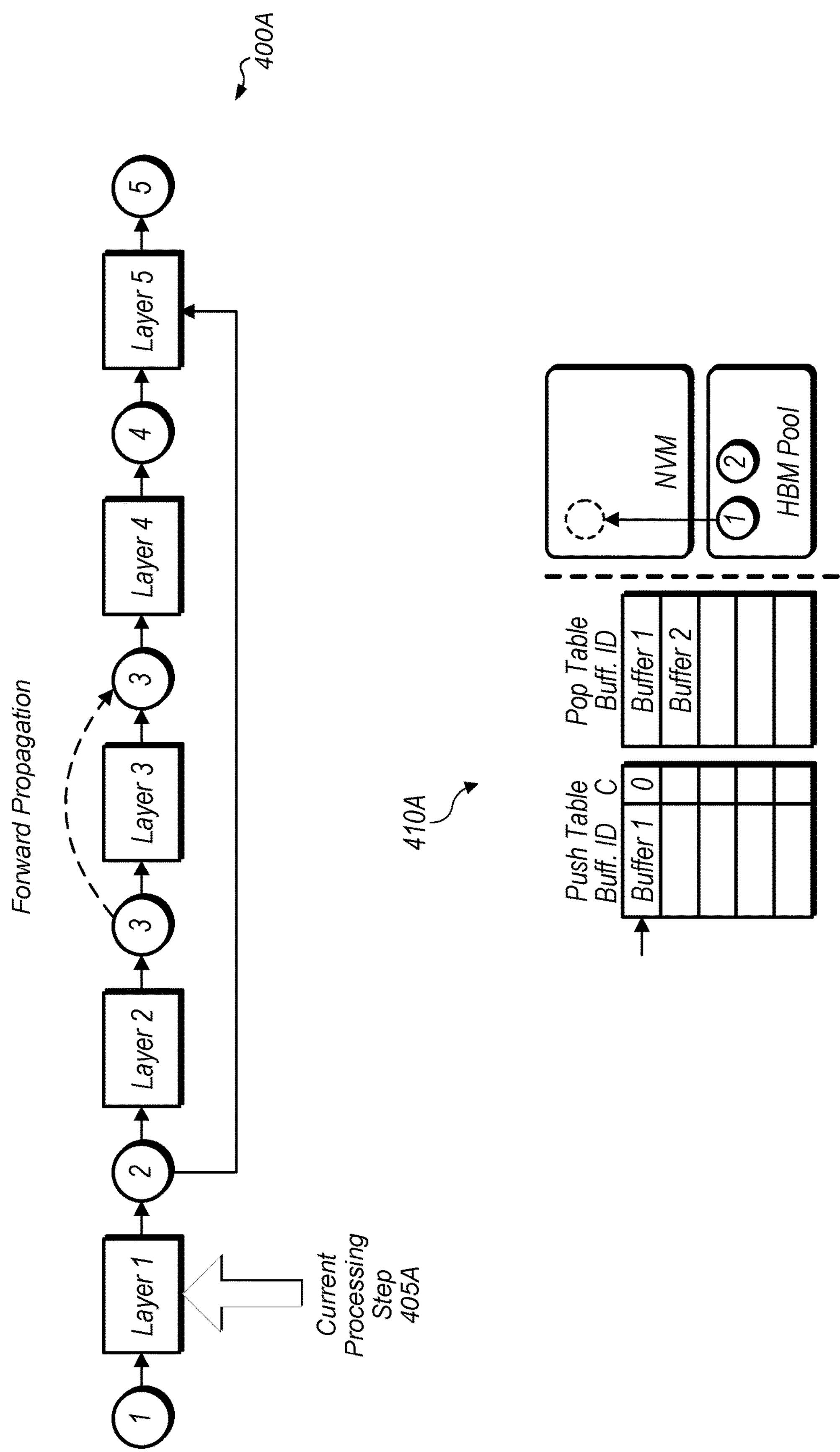
FIG. 4 is a block diagram of one implementation of performing forward propagation of a neural network.

Turning now to FIG. 4, a block diagram of one implementation of a neural network 400A is shown. Neural network 400A includes five layers with the circles shown at the inputs and outputs of the layers representing activation buffers. The various layers of neural network 400A can include convolutional layers, activation layers, pooling layers, fully-connected layers, and other types of layers. The specific configuration of neural network 400A is intended to provide one example of the implementation of a neural network in accordance with one implementation. It is assumed for the purpose of this discussion and the discussion of the subsequent figures that the activation buffers have the same size. However, this is intended for ease of illustration and does not preclude other implementations having activation buffers of different sizes. It should be understood that in other implementations, other neural networks can have other numbers of layers, other configurations, other numbers of activation buffers, varying sizes of activation buffers, and so on.

A forward propagation iteration is illustrated for the neural network 400A when the run-time manager (i.e., RENT) is enabled. The bold arrows indicate the inter-layer communication through buffers. The dashed arrow indicates buffers that are updated in-place by a layer. It is noted that neural network 400A resembles the layer connectivity that can be found in a residual neural network (ResNet) design. It is assumed for the purposes of this discussion that the HBM-pool has enough capacity to store 3 buffers and that Buffer 1 already allocates part of that capacity at the start of processing of layer 1.

The first layer, Layer 1, will start its forward propagation execution by launching one or more kernels to the GPU (or to another collection of processing elements). During the execution of layer 1, RENT reserves some of the HBM-pool capacity for Buffer 2 (the output buffer of Layer 1). At the same time, RENT updates the tables to reflect the observed buffers being utilized by layer 1. Two entries are added both in the pop-table and order-table, one for Buffer 1 and one for Buffer 2. An entry for Buffer 1 is also added in the push-table. Based on the current status of the tables, RENT selects Buffer 1 to start transferring from the HBM to the NVM asynchronously and in parallel with Layer 1's execution. State 410A presents the state of the NVM, the HBM-pool, the push-table, and the pop-table after the forward propagation execution of Layer 1. It is noted that the order-table is not included in FIG. 4 to avoid cluttering the figure.

As shown in FIG. 4, the arrow representing current processing step 405A points to layer 1 indicating that layer 1 is currently being processed during a forward propagation pass of neural network 400A. The illustration of push and pop tables and HBM Pool and NVM are also shown for point in time representation 410A. It is assumed for the purposes of this implementation that the processing of layer 1 has been completed at the point in time illustrated by representation 410A. Accordingly, an entry for buffer 1 has been added to the push table and entries for buffers 1 and 2 have been added to the pop table. The entry for buffer 1 in the push table has the C-bit equal to 0 to indicate that the transfer of data from the HBM pool to the NVM has not yet completed. The arrow pointing to buffer 1 in the push table indicates that the run-time manager has identified this buffer as a candidate for transfer. While the two memory devices in point in time representation 410A are labeled as an HBM pool and a NVM, it should be understood that these particular types of memory devices are merely illustrative of one particular implementation. In other implementations, other types of memory are used to implement the two separate memory devices.

Figure 5:
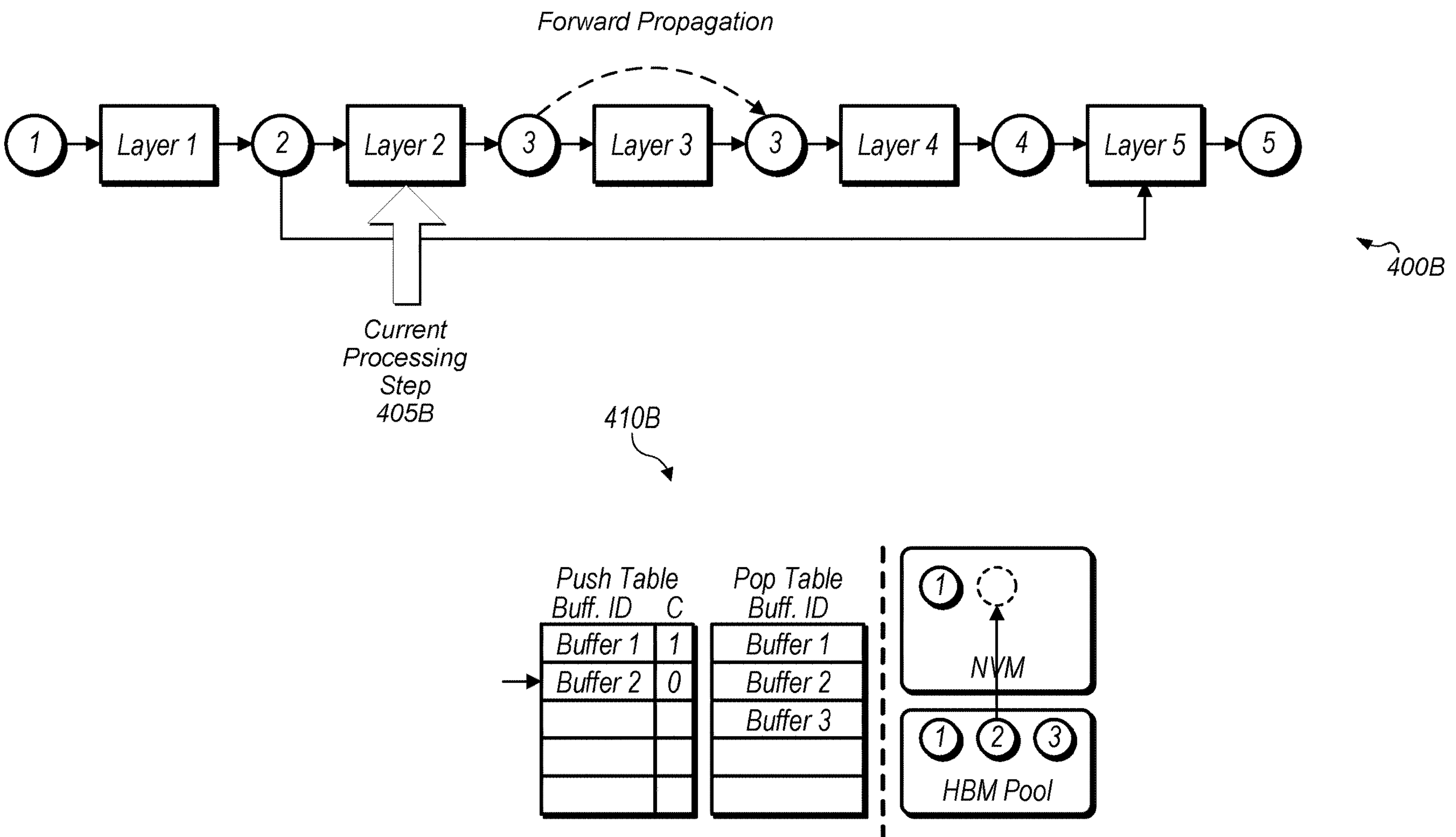
FIG. 5 is a block diagram of one implementation of performing forward propagation of a neural network.

Referring now to FIG. 5, a block diagram of one implementation of a neural network 400B is shown. Neural network 400B is intended to represent neural network 400A (of FIG. 4) at a later point in time. Also, the tables and memory state 410B shown at the bottom of FIG. 5 is intended to represent the state 410A (of FIG. 4) of tables and memory at a later point in time. As shown by the arrow pointing to layer 2 for current processing step 405B, it is assumed for the purposes of this discussion that layer 2 is being processed. Status 410B indicates the state of the push and pop tables and the memory devices after layer 2 has been processed.

Transferring Buffer 1 to NVM can overlap with the execution of layer 2 execution if the transfer has not yet completed. During execution of layer 2, RENT reserves part of the HBM-pool for buffer 3 and updates the tables. It is assumed that the data transfer of Buffer 1 completes during the execution of Layer 2. In response to detecting the completion of the data transfer, RENT marks the push table entry of buffer 1 as completed (C=1), and selects the next entry to issue a new buffer-transfer request. Thus, Buffer 2 starts getting transferred to the NVM as seen in the depictions of the HBM pool and NVM of state 410B. It is noted that synchronization is not enforced between the layer execution and the data transfer. This process allows RENT to fully utilize all of the time for execution of the layers and effectively hide the data transfer delay.

As shown in the push table, an entry for buffer 2 has been added to the push table. Also, the C-bit for the entry for buffer 1 is now set to "1" to indicate that buffer 1 has now been copied in its entirety to the NVM. Buffer 2 is currently in the process of being copied to the NVM at the point in time represented by state 410B. Also, an entry for buffer 3 has been added to the pop table since the output of layer 2 is buffer 3.

Figure 6:
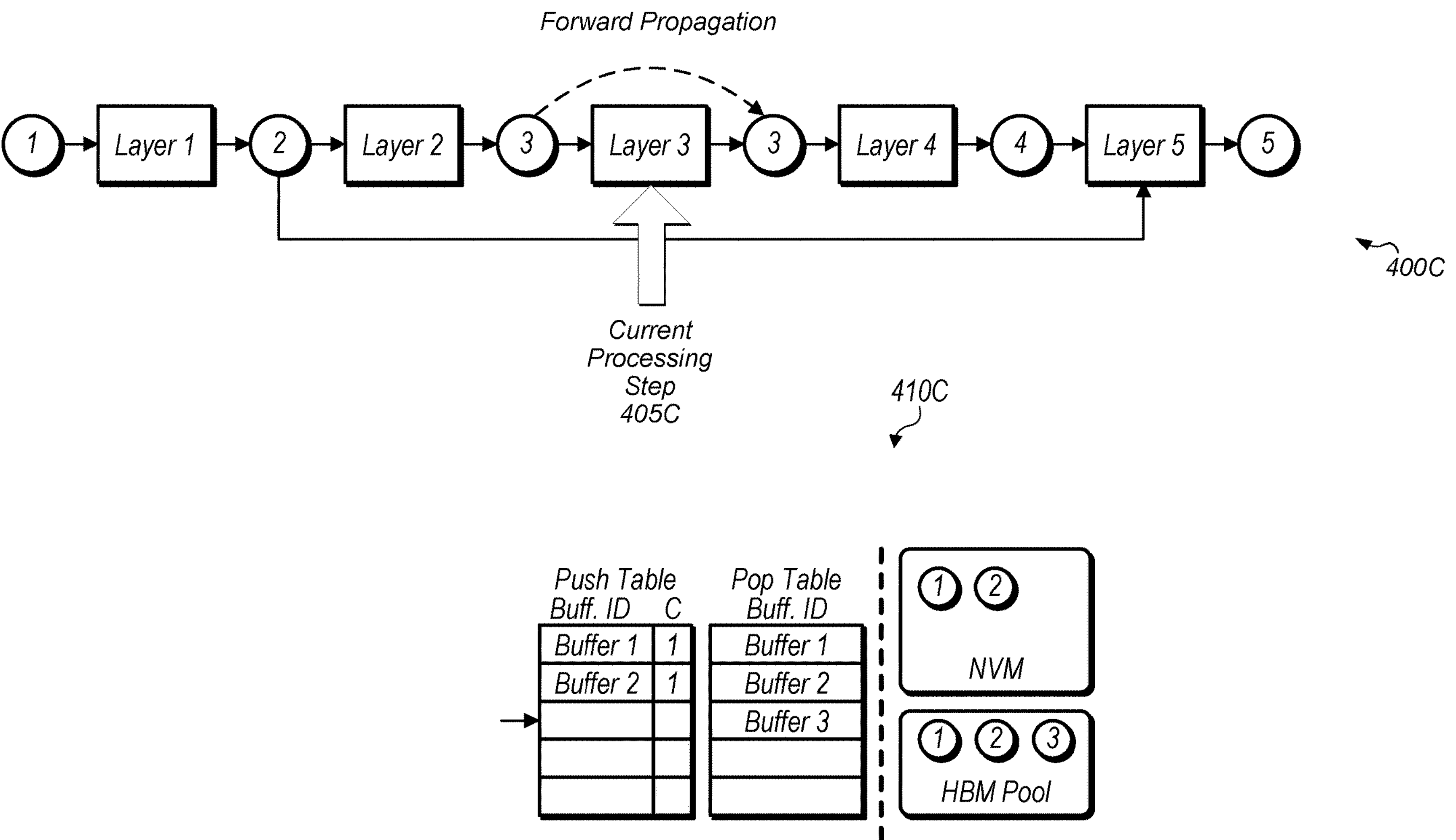
FIG. 6 is a block diagram of one implementation of performing forward propagation of a neural network.

Turning now to FIG. 6, a block diagram of one implementation of a neural network 400C is shown. Neural network 400C is intended to represent neural network 400B (of FIG. 5) at a later point in time. Also, the tables and memory state 410C shown at the bottom of FIG. 6 is intended to represent the state 410B (of FIG. 5) of tables and memory at a later point in time. As shown by the arrow pointing to layer 3 for current processing step 405C, it is assumed for the purposes of this discussion that layer 3 is being processed. State 410C indicates the state of the push and pop tables and the memory devices after layer 3 has been processed. At the point in time represented by state 410C, buffer 2 has been copied in its entirety to the NVM. Accordingly, the C-bit is now set to "1" for the entry in the push table for buffer 2. During the execution of layer 3, RENT does not add an entry for buffer 3 in the push table since buffer 3 is observed as both an input and output of layer 3.

Figure 7:
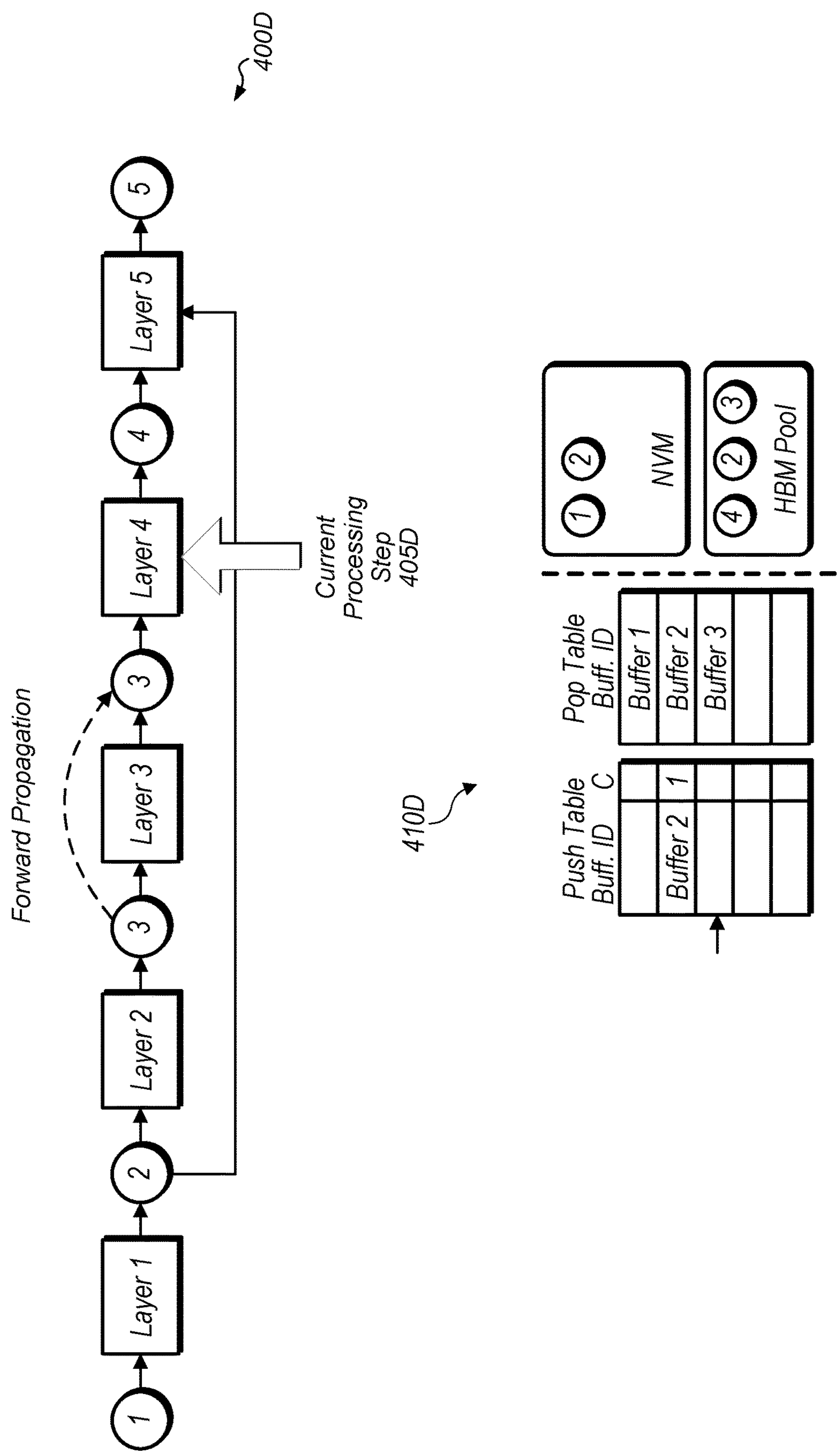
FIG. 7 is a block diagram of one implementation of performing forward propagation of a neural network.

Referring now to FIG. 7, a block diagram of one implementation of a neural network 400D is shown. Neural network 400D is intended to represent neural network 400C (of FIG. 6) at a later point in time. Also, the tables and memory state 410D shown at the bottom of FIG. 7 is intended to represent the state 410C (of FIG. 6) of tables and memory at a later point in time. As shown by the arrow pointing to layer 4 for current processing step 405D, it is assumed for the purposes of this discussion that layer 4 has been processed at the point in time represented by neural network 400D. Accordingly, state 410D indicates the status of the push and pop tables and the memory devices after layer 4 has been processed.

When layer 4 is issued for forward propagation execution, RENT tries to reserve capacity in the HBM pool for buffer 4. It is assumed for the purposes of this implementation, that the HBM pool was fully occupied when layer 4 is issued for forward propagation. Accordingly, to make room for activation buffer 4, RENT checks the push table for an entry with a C-bit set. Since the entry for buffer 1 has its C-bit set (as shown in the push table of FIG. 6), the runtime manager selects the locations of the HBM pool storing buffer 1 to be overwritten by buffer 4, and RENT discards the push table entry for buffer 1. Accordingly, as layer 4 is processed, buffer 4 is written to the HBM pool to the locations previously occupied by buffer 1. In one implementation, in the case that the data transfer of buffer 1 to the NVM was not yet completed, RENT would have blocked the execution of layer 3 until enough HBM-pool capacity was freed.

At this point in the forward propagation execution of neural network 400D, RENT observes that buffers 1 and 2 have already been transferred to the NVM and that the capacity of the HBM-pool is enough to store the remaining buffers (buffers 3, 4 and 5). Therefore, for the rest of the forward propagation execution, RENT does not add any further entries to the push-table and pop-table. However, RENT continues to update the order-table (not shown) according to the usage of buffers in the order in which they are used.

Figure 8:
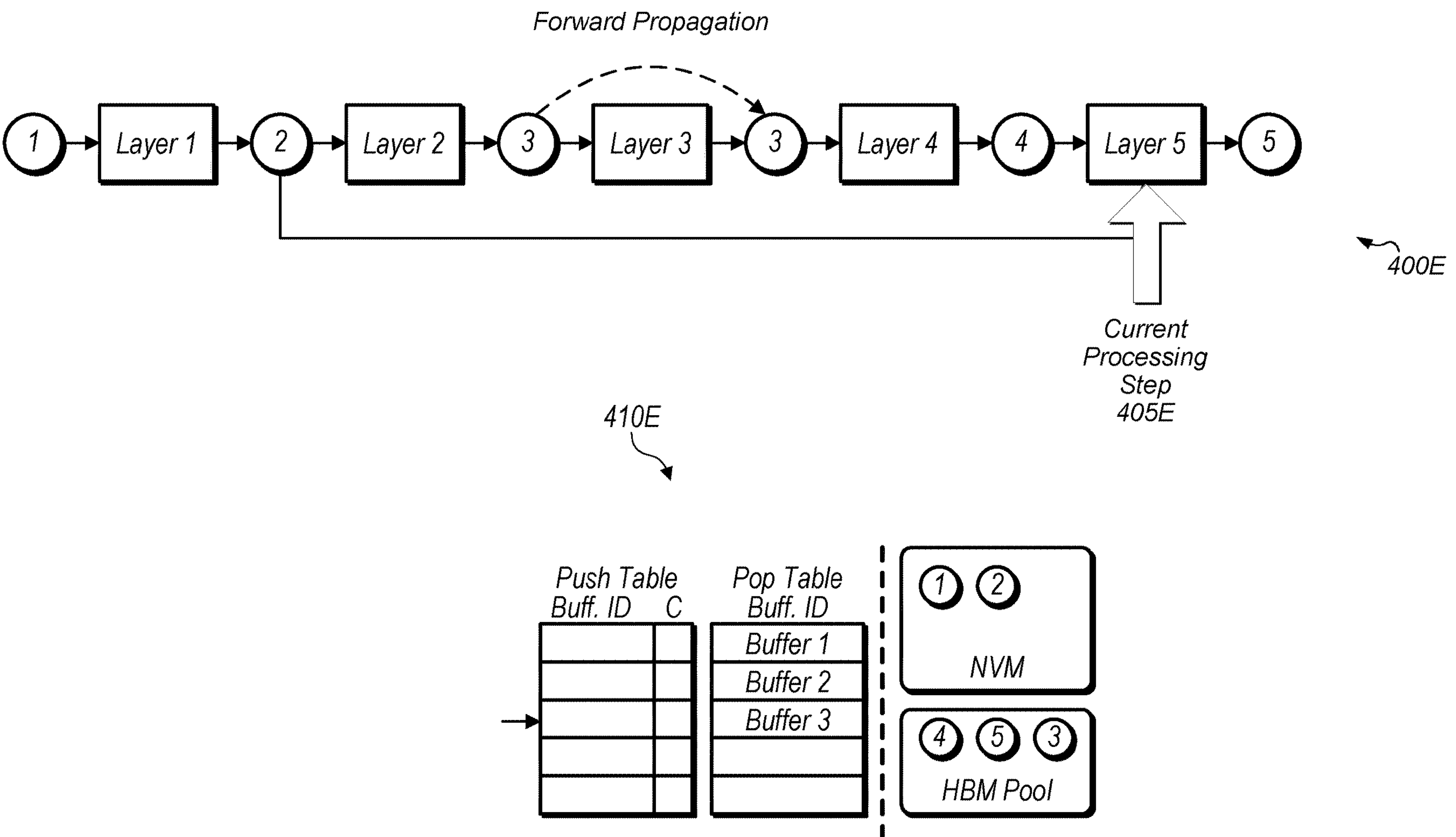
FIG. 8 is a block diagram of one implementation of performing forward propagation of a neural network.

Turning now to FIG. 8, a block diagram of one implementation of a neural network 400E is shown. Neural network 400E is intended to represent neural network 400D (of FIG. 7) at a later point in time. Also, the tables and memory state 410E shown at the bottom of FIG. 8 is intended to represent the state 410D (of FIG. 7) of tables and memory at a later point in time. As shown by the arrow pointing to layer 5 for current processing step 405E, it is assumed for the purposes of this discussion that layer 5 has been processed. Status 410E indicates the state of the push and pop tables and the memory devices after layer 5 has been processed.

Since the HBM pool is full at the start of processing of layer 5, the runtime manager determines if there is a buffer to overwrite in the HBM pool by checking the push table. Since the push table in state 410D (of FIG. 7) had an entry for buffer 2 with the C-bit set to "1", the runtime manager selects buffer 2 to be overwritten by buffer 5. Accordingly, as layer 5 is processed, the activation buffer 5 will be written to the same HBM locations as buffer 2. Also, the entry for buffer 2 in the push table is discarded. Since layer 5 has two input buffers (buffer 4 and buffer 2) and due to the HBM pool capacity limitations and the long reuse distance between layer 1 and layer 5, buffer 2 no longer has an HBM allocation. Thus, layer 5 uses the NVM allocation of buffer 2 and potentially incurs some performance penalty.

In one implementation, it is noted that by the end of the forward propagation cycle, the total HBM and NVM capacity that is allocated to store activations buffers is the same as the total capacity of the activations buffers. No additional capacity is allocated. Additionally, it should be understood that when RENT frees the allocation of a buffer from the HBM-pool, no physical memory is actually freed. Instead, the same allocation is reused by reserving it for different buffers. In one implementation, the actual physical allocation of the HBM-pool only happens once at the start of the neural network training. It is also noted that during the first forward propagation iteration, the necessary NVM capacity is allocated for the buffers that are transferred from the HBM. In one implementation, these allocations only take place in the very first forward propagation iteration as the same allocations are reused for future iterations when the buffer transfers are repeated.

Figure 9:
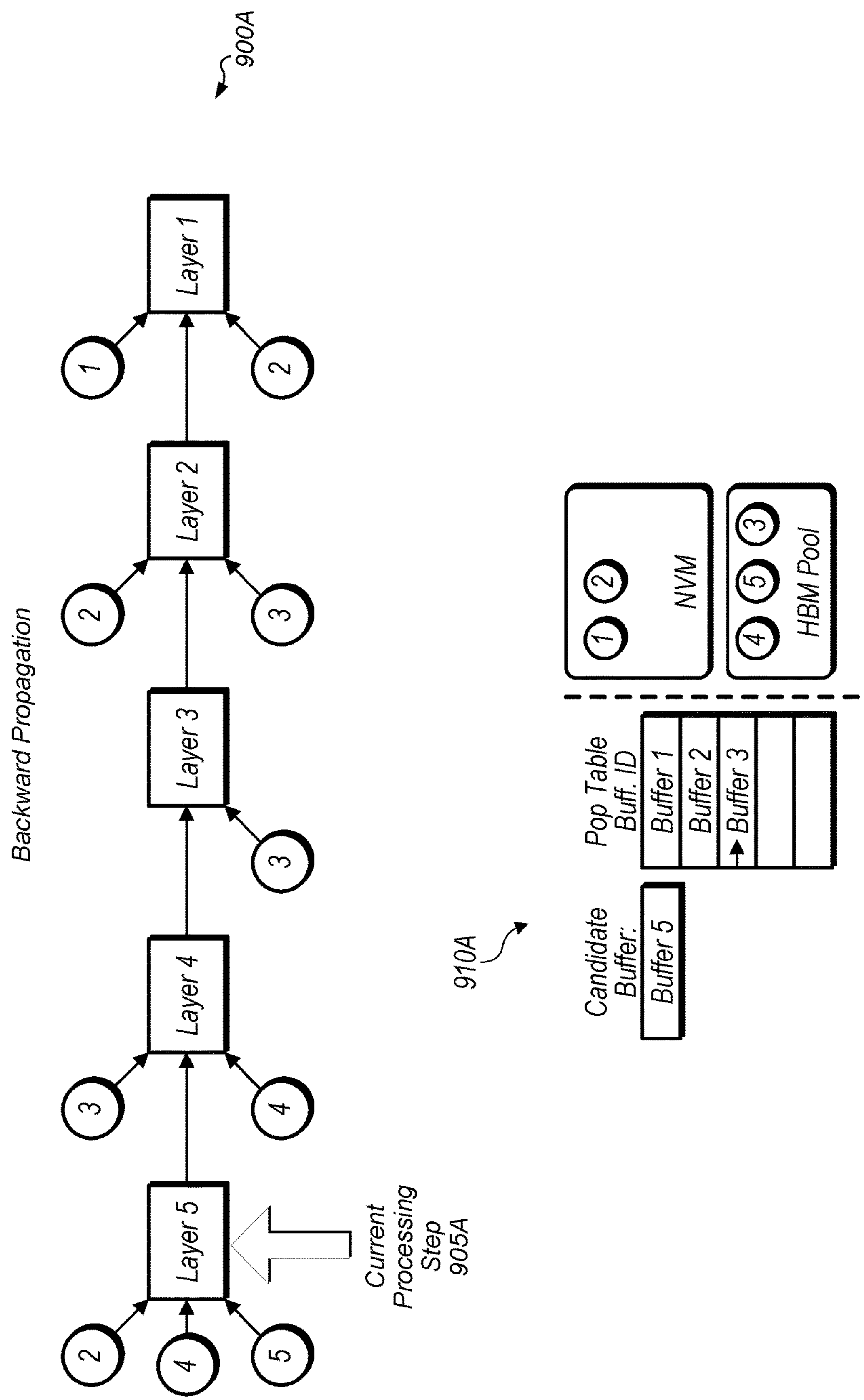
FIG. 9 is a block diagram of one implementation of performing backward propagation of a neural network.

Referring now to FIG. 9, a block diagram of one implementation of performing backward propagation of a neural network 900A is shown. After the forward propagation has ended, backward propagation begins. It is noted that during the backward propagation the data flow of neural network 400 is reversed. In one implementation, RENT is triggered through the RENTBP( ) API to start the BP data management. Neural network 900A is intended to represent a backward propagation pass through the same neural network 400A-E shown in FIGS. 4-8 after a forward propagation pass has been completed. The runtime manager handles the backward propagation pass using the entries in the tables which were populated during the forward propagation pass through the neural network 400A-E.

As shown, layer 5 consumes activation buffers 2, 4, and 5. During the current processing step 905A, RENT marks buffer 5 as a candidate for removal from the HBM pool in the next kernel execution, based on the entry for buffer 5 in the order table (not shown). It should be understood that the examples of the different layers and their corresponding input and output activation buffers shown for neural network 900A is merely indicative of one particular implementation. In other implementations, the configuration of buffers being processed by the various layers can vary. Status 910A presents the state of the NVM, HBM pool, candidate buffer, and pop table after the backward propagation execution of layer 5. It is noted that the order table and push table are not shown to avoid cluttering the figure.

Figure 10:
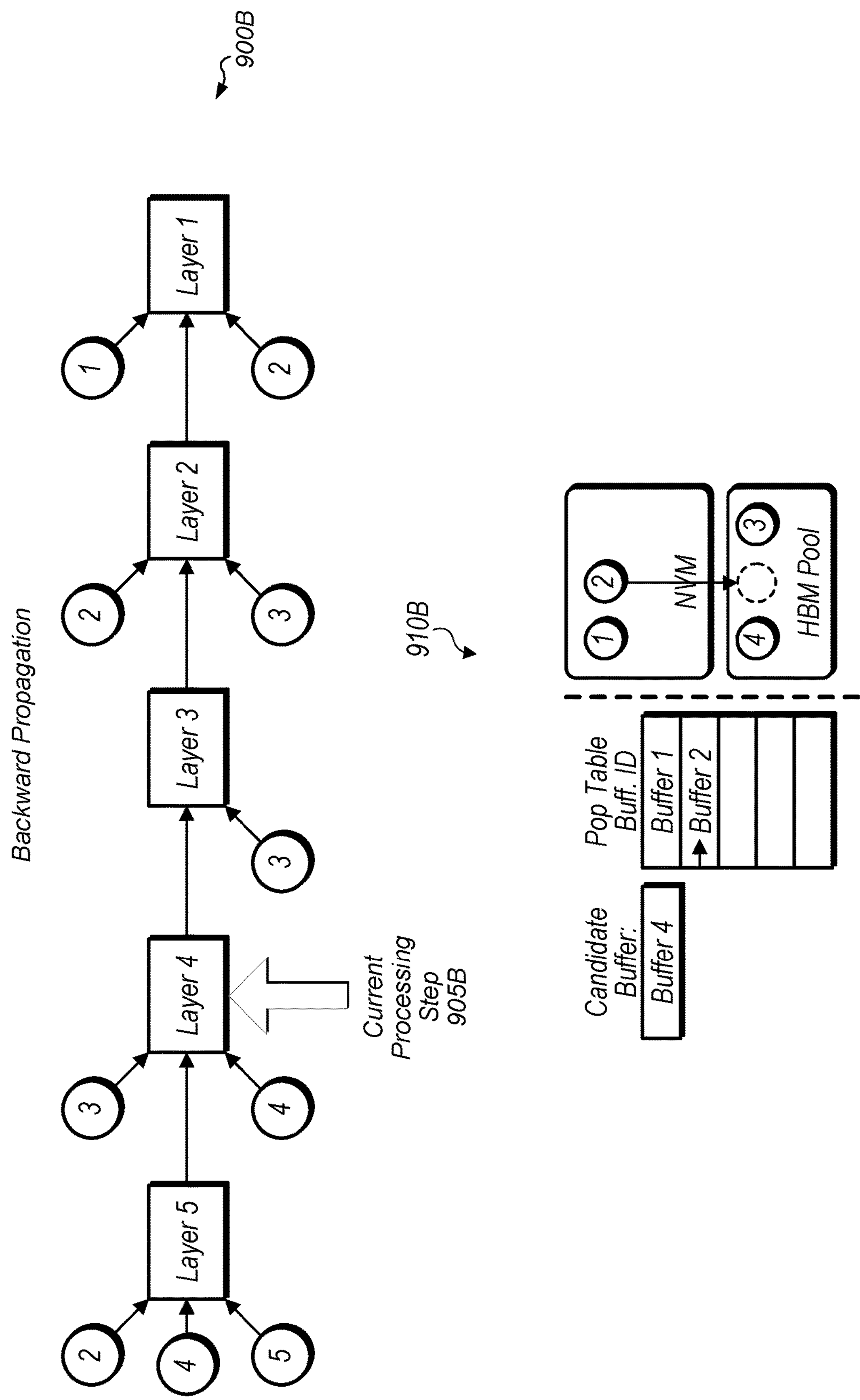
FIG. 10 is a block diagram of one implementation of performing backward propagation of a neural network.

Turning now to FIG. 10, a block diagram of one implementation of a backward propagation pass through a neural network 900B is shown. Neural network 900B is intended to represent neural network 900A (of FIG. 9) at a later point in time. At the point in time illustrated by neural network 900B, the current processing step 905B is layer 4. Status snapshot 910B represents the status of the candidate buffer, pop table, HBM pool, and NVM after layer 4 has been processed during the backward propagation pass of neural network 900B. During the execution of layer 4, when searching for a buffer that can be discarded from the HBM pool, the runtime manager determines that the candidate buffer 5 is not being used. In response to making this determination, the runtime manager initiates the transfer of buffer 2 from NVM to the HBM pool into the locations storing buffer 5. Also, a new buffer, buffer 4, is selected as a candidate buffer which can be replaced after the current processing step 905B has completed the processing of layer 4. Additionally, the runtime manager selects the oldest entry of the pop table corresponding to buffer 2, and then the runtime manager issues a buffer transfer request to the buffer transfer engine to transfer buffer 2 from NVM to HBM.

Figure 11:
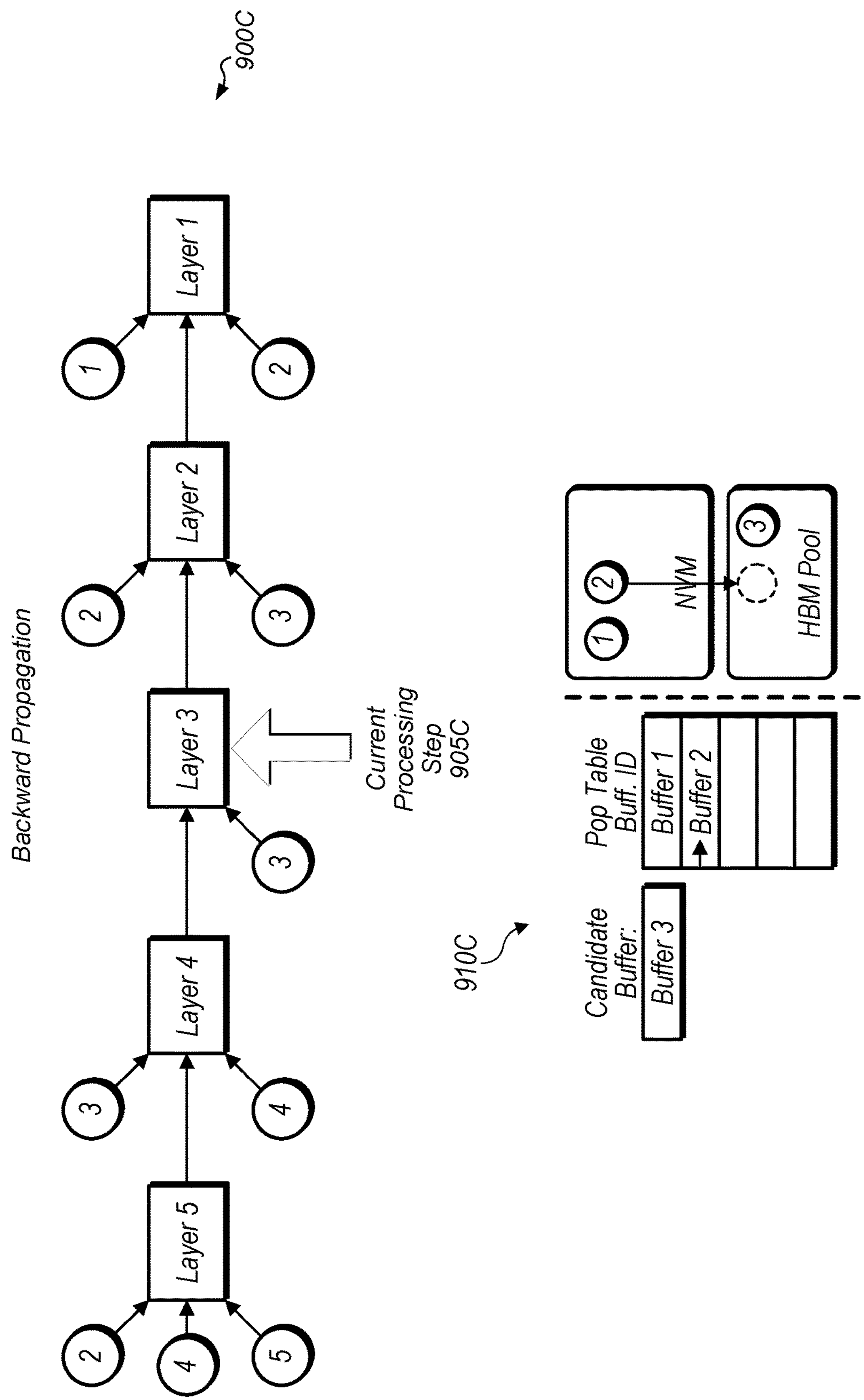
FIG. 11 is a block diagram of one implementation of performing backward propagation of a neural network.

Referring now to FIG. 11, a block diagram of one implementation of a backward propagation pass of a neural network 900C is shown. Neural network 900C is intended to represent neural network 900B (of FIG. 10) at a later point in time. At the point in time illustrated by neural network 900C, the current processing step 905C is layer 3. Status snapshot 910C represents the status of the candidate buffer, pop table, HBM pool, and NVM after layer 3 has been processed during the backward propagation pass of neural network 900C.

During step 905C, the runtime manager marks the locations storing buffer 4 from the HBM pool as invalid, and the runtime manager also marks buffer 3 as a candidate for removal from the HBM pool. In this example, it is assumed that the backward propagation processing of layer 3 overlaps with the copying of buffer 2 to the HBM pool. When the copying of buffer 2 to the HBM pool completes, this will trigger the runtime manager to remove the entry of buffer 2 from the pop table and to select the next entry (for buffer 1) from the pop table. When selecting the entry for buffer 1 from the pop table, the runtime manager issues a new buffer-transfer request to transfer buffer 1 from NVM to HBM. Similar to the forward propagation pass, the runtime manager asynchronously initiates the copying of buffers to the HBM pool with respect to GPU kernel execution.

Figure 12:
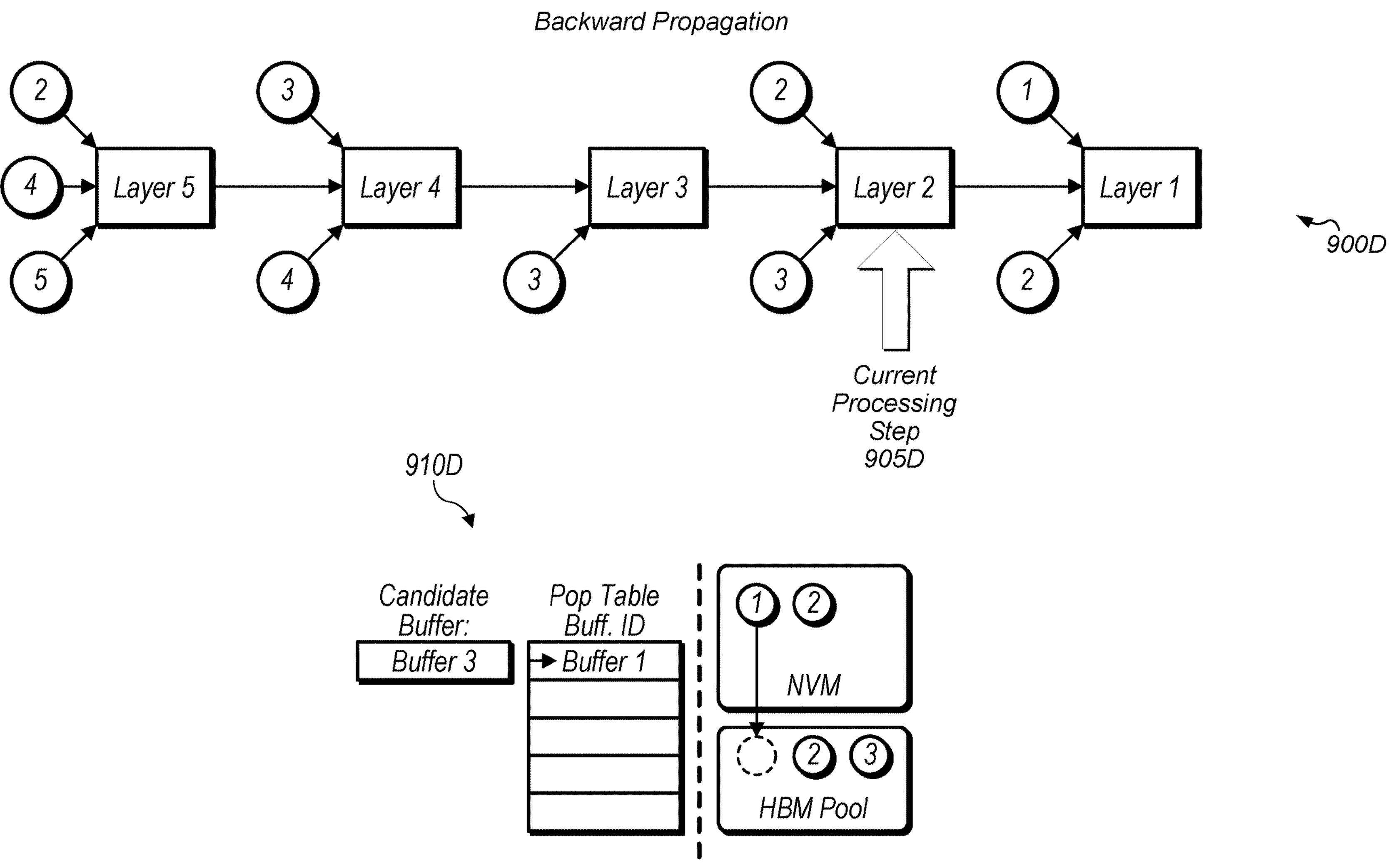
FIG. 12 is a block diagram of one implementation of performing backward propagation of a neural network.

Turning now to FIG. 12, a block diagram of one implementation of a backward propagation pass of a neural network 900D is shown. Neural network 900D is intended to represent neural network 900C (of FIG. 11) at a later point in time. At the point in time illustrated by neural network 900D, the current processing step 905D is layer 2. Status snapshot 910D represents the status of the candidate buffer, pop table, HBM pool, and NVM after layer 2 has been processed during the backward propagation pass of neural network 900D.

In one implementation, if the transfer of buffer 2 has not yet completed, the runtime manager will block execution of layer 2. When the data transfer of buffer 2 completes, the runtime manager allows layer 2 to proceed to execution. Although neural network 900D has the option of reading buffer 2 from the NVM without waiting for the data transfer to complete, in one implementation, it is preferred to access the HBM if possible since the NVM has limited bandwidth. Since the candidate buffer, buffer 3, is used as an input to layer 2, buffer 3 is not yet removed from the HBM pool. It is assumed that buffer 1 is still being copied from NVM to the HBM pool at the point in time represented by status snapshot 910D.

Figure 13:
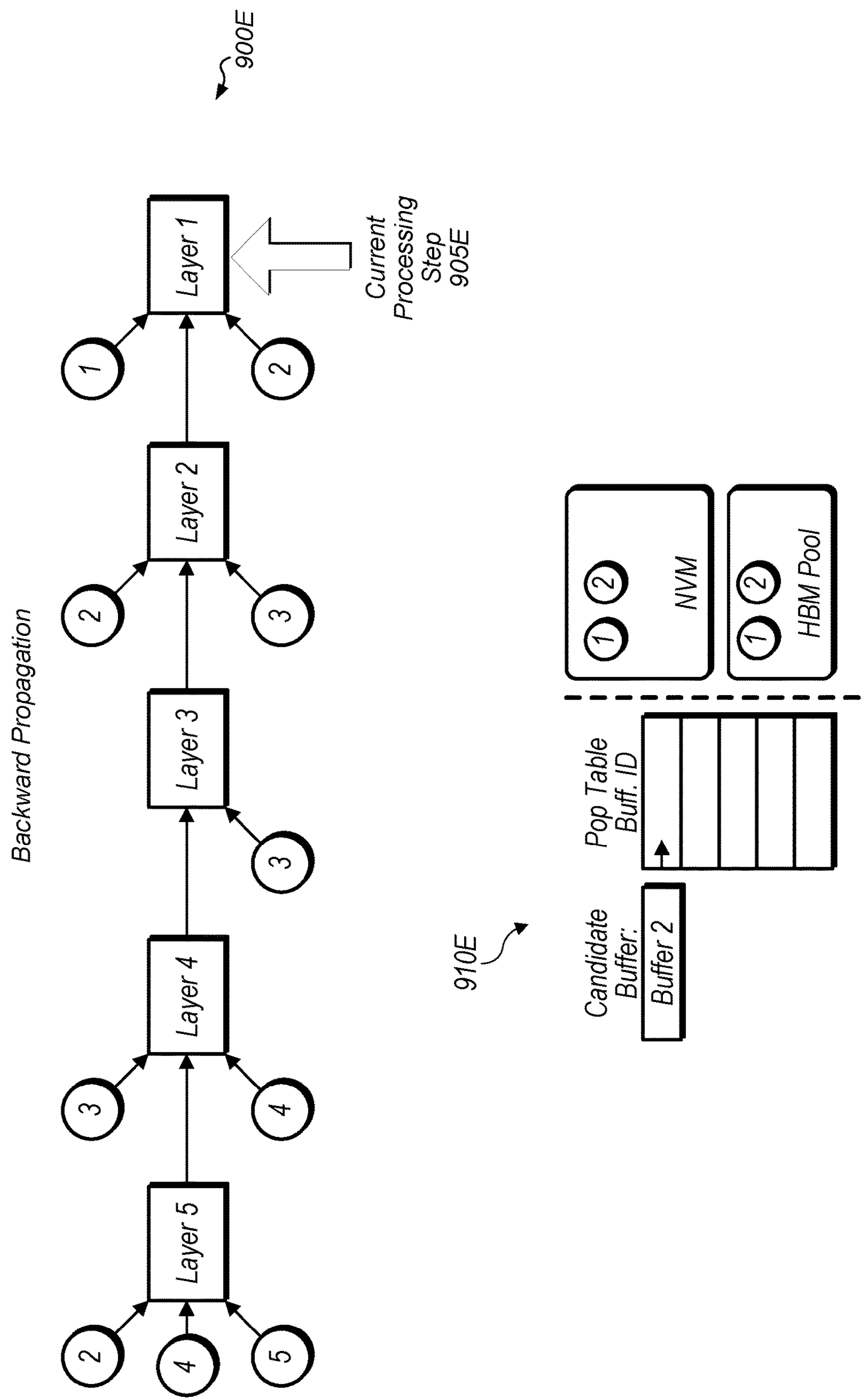
FIG. 13 is a block diagram of performing backward propagation of one implementation of a neural network.

Referring now to FIG. 13, a block diagram of one implementation of a backward propagation pass of a neural network 900E is shown. Neural network 900E is intended to represent neural network 900D (of FIG. 11) at a later point in time. At the point in time illustrated by neural network 900E, the current processing step 905E is layer 5. Status snapshot 910E represents the status of the candidate buffer, pop table, HBM pool, and NVM after layer 5 has been processed during the backward propagation pass of neural network 900E. At the point in time represented by status snapshot 910E, buffer 2 is the candidate buffer and buffer 1 has been copied from NVM to the HBM pool. It is noted that when buffers are transferred from NVM to HBM, the NVM allocations are not freed. Rather, the same allocations are used for the following forward propagation iterations where buffers will have to move back again to the NVM.

Figure 14:
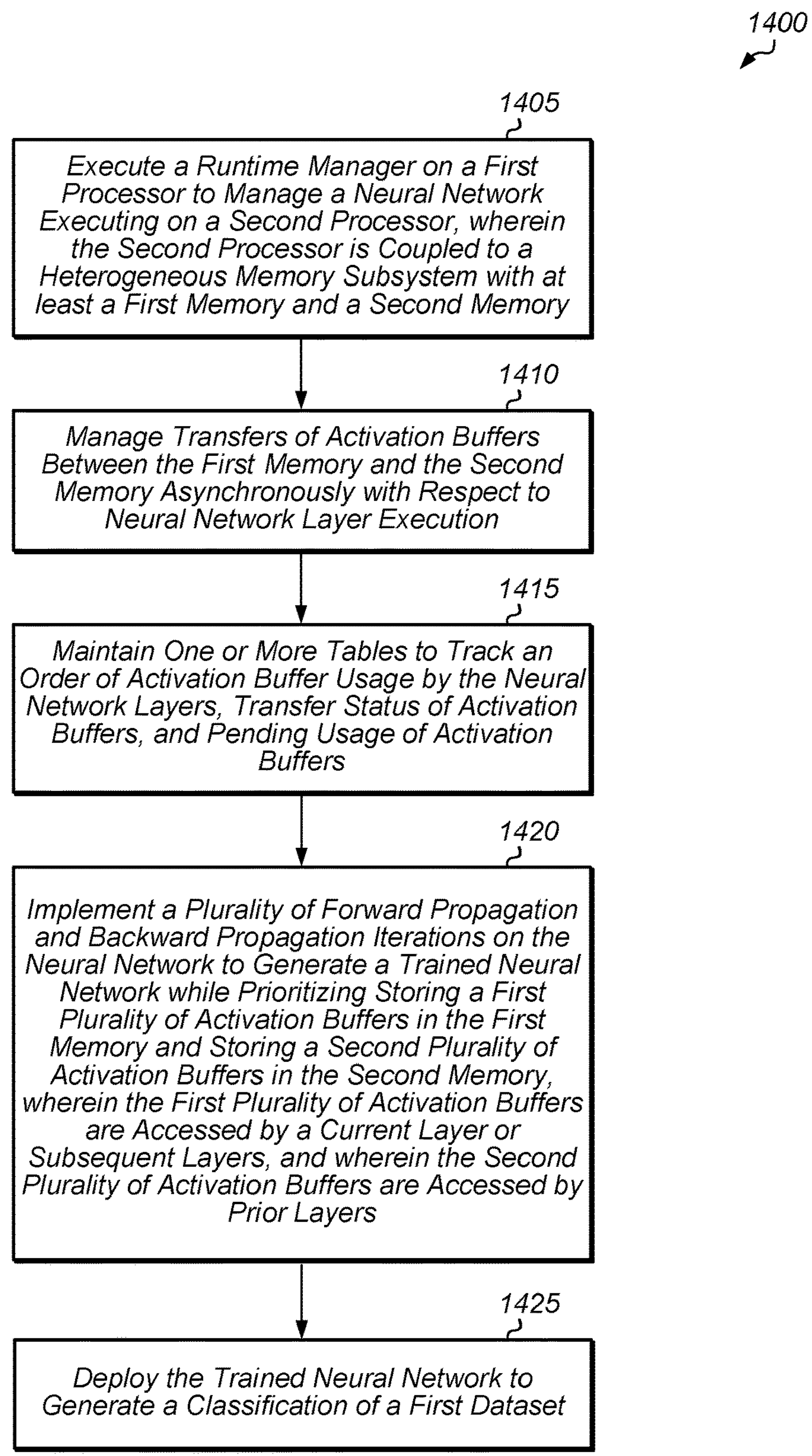
FIG. 14 is a generalized flow diagram illustrating one implementation of a method for managing neural network training on processing units with heterogeneous memory.
Figure 15:
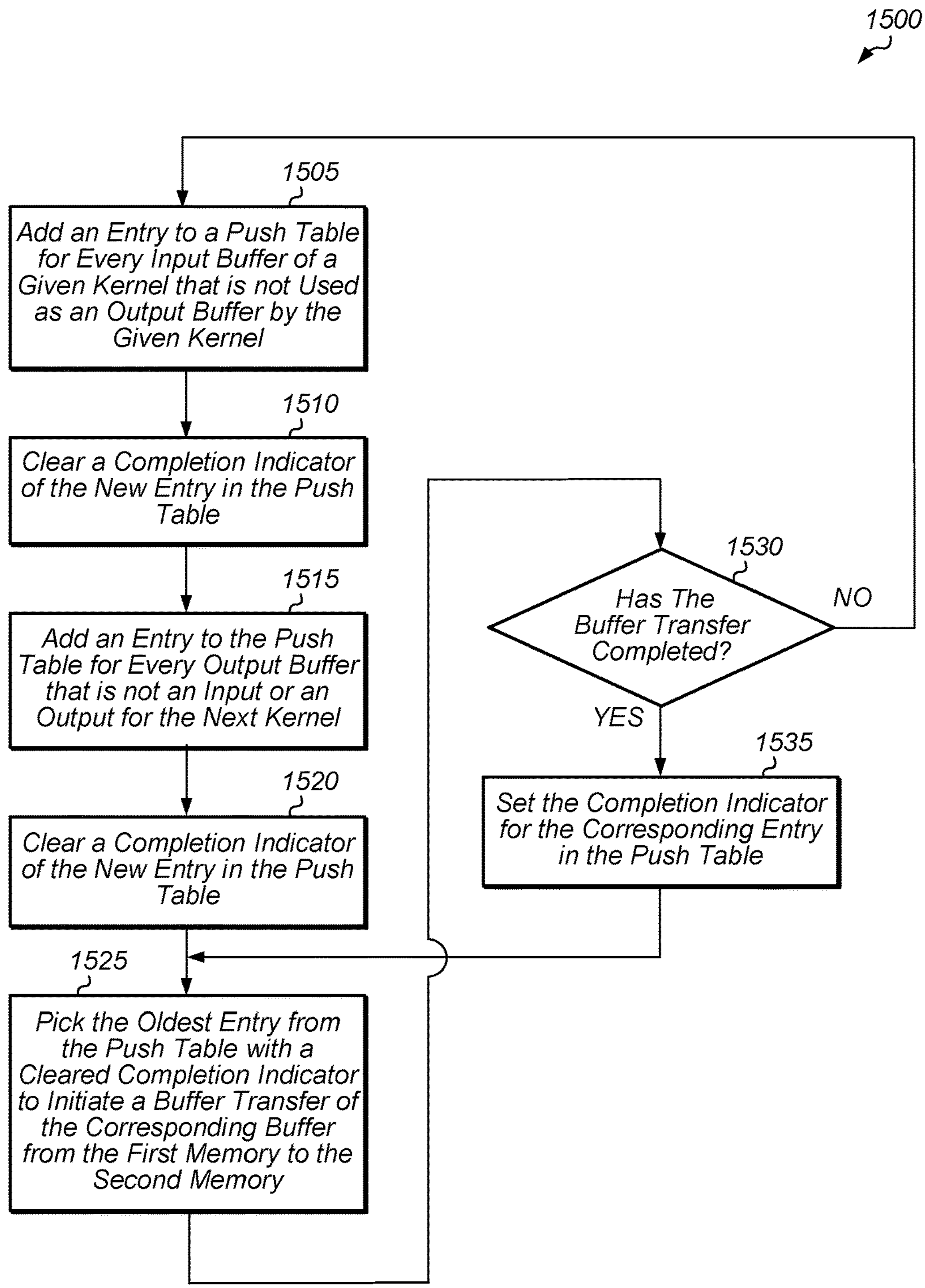
FIG. 15 is a generalized flow diagram illustrating one implementation of a method for maintaining a push table during neural network training.
Figure 16:
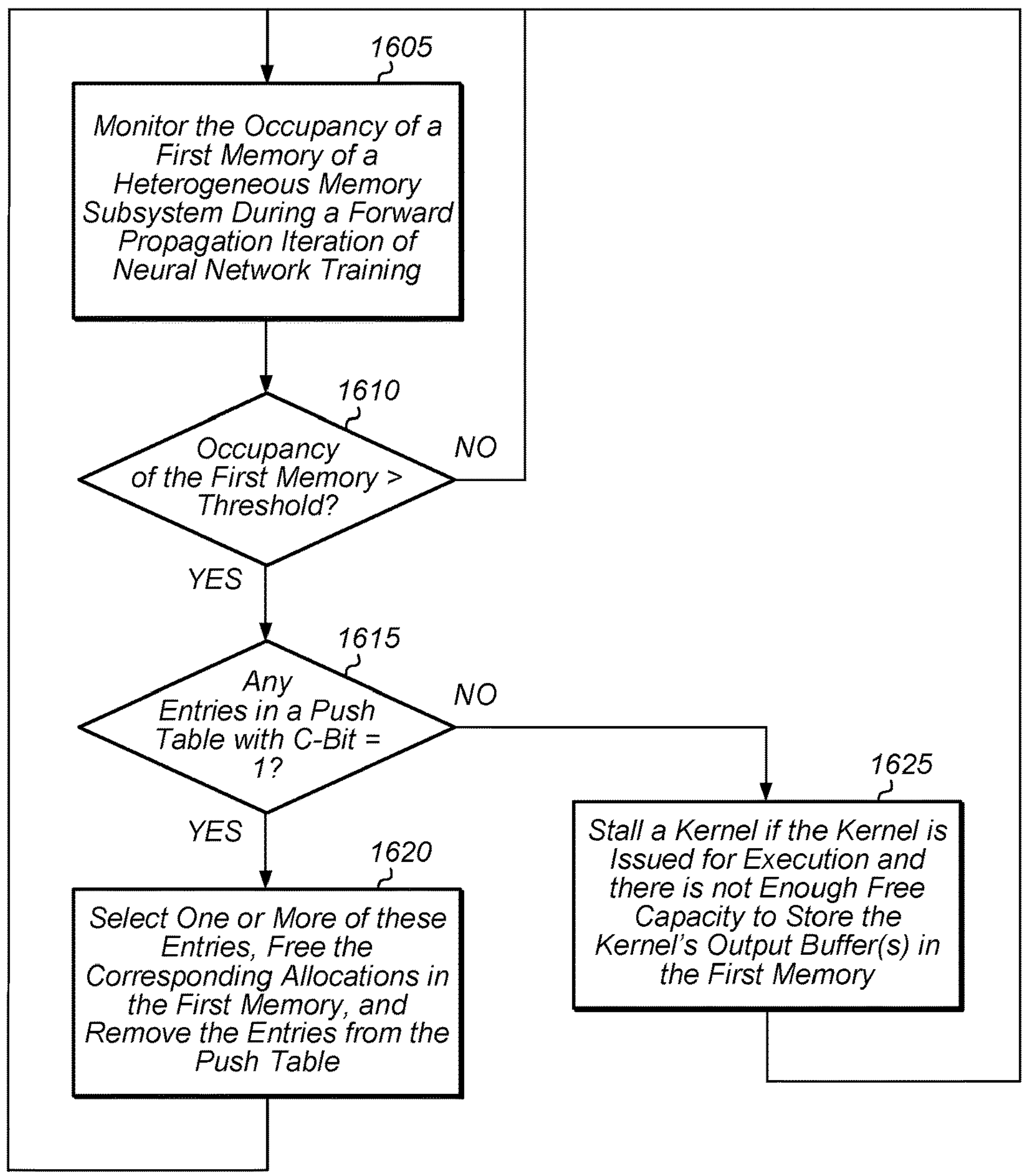
FIG. 16 is a generalized flow diagram illustrating one implementation of a method for a runtime manager managing a push table during neural network training.
Figure 17:
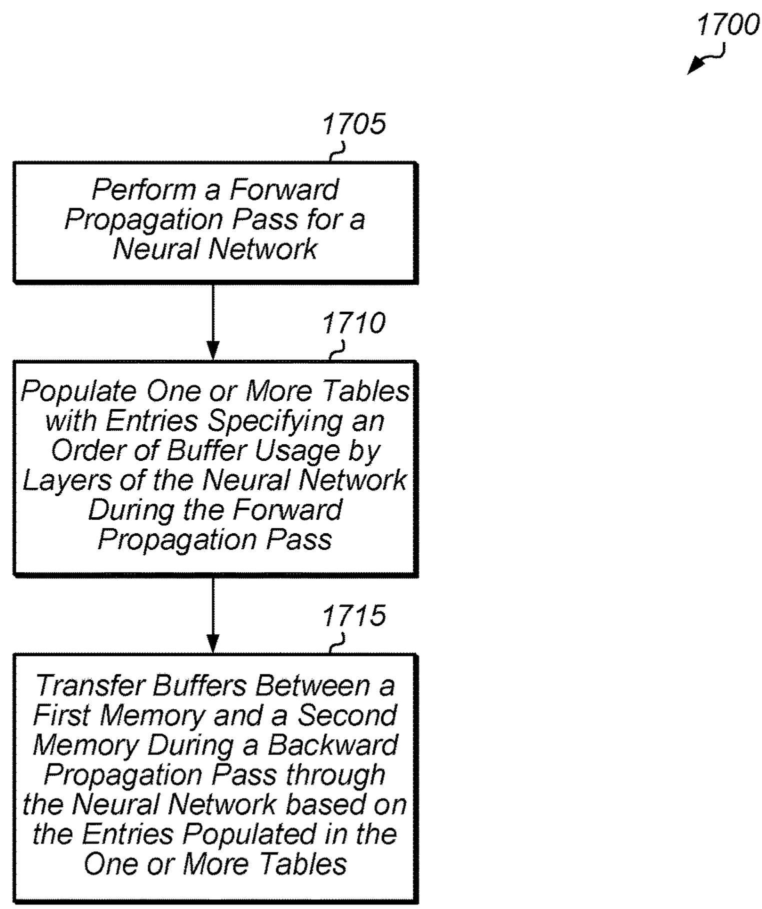
FIG. 17 is a generalized flow diagram illustrating one implementation of a method for efficiently training a neural network.

Turning now to FIG. 14, one implementation of a method 1400 for managing neural network training on processing units with heterogeneous memory is shown. For purposes of discussion, the steps in this implementation and those of FIG. 15-17 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 1400.

A runtime manager executes on a first processor to manage a neural network executing on a second processor, wherein the second processor is coupled to a heterogeneous memory subsystem with at least a first memory and a second memory (block 1405). In one implementation, the first processor, second processor, and heterogeneous memory subsystem are part of a given computing system. In one implementation, the first memory is a dynamic random-access memory DRAM (e.g., HBM) and the second memory is a NVM. In other implementations, the first and second memories are other types of memory devices. The runtime manager manages transfers of activation buffers between the first memory and the second memory asynchronously with respect to neural network layer execution (block 1410). The runtime manager maintains one or more tables to track an order of activation buffer usage by the neural network, transfer status of activation buffers, and pending usage of activation buffers (block 1415). In one implementation, the one or more tables include a push table, a pop table, and an order table. In other implementations, the one or more tables include other numbers and/or types of tables.

The runtime manager implements a plurality of forward propagation and backward propagation iterations on the neural network to generate a trained neural network while prioritizing storing a first plurality of activation buffers in the first memory and storing a second plurality of activation buffers in the second memory, wherein the first plurality of activation buffers are accessed by a current layer or subsequent layers, and wherein the second plurality of activation buffers are accessed by prior layers (block 1420). Next, the system deploys the trained neural network to generate a classification of a first dataset (block 1425). After block 1425, method 1400 ends. In one implementation, the first dataset is an image, and the classification identifies a given category to which the image belongs. In another implementation, the first dataset is a video, and the classification assigns the video to a given category. In other implementations, the first dataset includes other types of data. In one implementation, the runtime manager performs the steps of method 1400 for activation buffers only. In other implementations, the runtime manager performs the steps of method 1400 for activation buffers and/or one or more other types of buffers.

Referring now to FIG. 15, one implementation of a method 1500 for maintaining a push table during the execution of a neural network kernel is shown. During a forward propagation iteration of neural network training, a runtime manager adds an entry to a push table for every input buffer of a given kernel that is not used as an output buffer by the given kernel (block 1505). When adding an entry to the push table for a given input buffer, the runtime manager clears (i.e., sets equal to zero) a completion indicator (i.e., C-bit) of the new entry (block 1510). Clearing the completion indicator means that the buffer has not yet been transferred from a first memory to a second memory of a heterogeneous memory subsystem. Also, the runtime manager adds an entry to the push table for every output buffer that is not an input or an output for the next kernel (block 1515). When adding an entry to the push table for a given output buffer, the runtime manager clears a completion indicator of the new entry (block 1520). It is noted that the runtime manager adds only one entry to the push table for each buffer during the forward propagation iteration. In other words, there are no duplicate entries for a given buffer in the push table.

Additionally, during the forward propagation iteration, the runtime manager picks the oldest entry from the push table with a cleared completion indicator to initiate a buffer transfer for the corresponding buffer from the first memory to the second memory (block 1525). If there are no entries in the push table with a cleared completion indicator, then method 1500 returns to block 1505. When the buffer transfer completes (conditional block 1530, "yes" leg), the runtime manager sets the completion indicator for the corresponding entry in the push table (block 1535), and then method 1500 returns to block 1525. If the buffer transfer has not completed (conditional block 1530, "no" leg), then method 1500 returns to block 1505. It is noted that in one implementation, method 1500 is performed in parallel with method 1600 (of FIG. 16). In one implementation, the runtime manager performs the steps of method 1500 for activation buffers only. In other implementations, the runtime manager performs the steps of method 1500 for activation buffers and/or one or more other types of buffers.

Turning now to FIG. 16, one implementation of a method 1600 for a runtime manager managing a push table during neural network training is shown. A runtime manager monitors the occupancy of a first memory of a heterogeneous memory subsystem during a forward propagation iteration of neural network training (block 1605). As used herein, "heterogeneous memory" is defined as at least two separate memory devices with different access latencies. For example, in one implementation, the heterogeneous memory includes at least a HBM and a NVM. The HBM is representative of a relatively fast (or low-latency access) memory device while the NVM is representative of a relatively slow (or high-latency access) memory device. In other implementations, the heterogeneous memory includes other types of memory devices. Also, in some implementations, the relatively fast memory device is also a relatively low capacity memory device while the relatively slow memory device is a relatively high capacity memory device.

If the occupancy of the first memory is above a threshold (conditional block 1610, "yes" leg), then the runtime manager determines if any entries in a push table have their completion indicator set (i.e., C-Bit=1) (conditional block 1615). In one implementation, the threshold is determined based on the capacity needed for the buffers of the current layer and/or one or more subsequent layers of the neural network. In another implementation, the threshold is programmable. In a further implementation, the threshold is a predetermined percentage of the total occupancy of the first memory. If the occupancy of the first memory is less than or equal to the threshold (conditional block 1610, "no" leg), then method 1600 returns to block 1605.

If any entries in the push table have their completion indicator set (conditional block 1615, "yes" leg), then the runtime manager selects one or more of these entries, frees the corresponding allocations in the first memory, and removes the entries from the push table (block 1620). If there are no entries with a set completion indicator (conditional block 1615, "no" leg), then the runtime manager stalls a kernel if the kernel is issued for execution and there is not enough free capacity to store the kernel's output buffer(s) in the first memory (block 1625). After blocks 1620 and 1625, method 1600 returns to block 1605.

Referring now to FIG. 17, one embodiment of a method 1700 for efficiently training a neural network is shown. A forward propagation pass is performed for a neural network (block 1705). During the forward propagation pass, one or more tables are populated with entries specifying an order of buffer usage by layers of the neural network during the forward propagation pass (block 1710). In one implementation, the one or more tables include an order table and a pop table. The order table records the order in which buffers can be removed from a first memory during a backward propagation pass. The pop table records the order in which buffers should be copied from a second memory to the first memory during the backward propagation pass. Buffers are transferred between a first memory and a second memory during the backward propagation pass through the neural network based on the entries populated in the one or more tables (block 1715). In one implementation, the first memory is a dynamic random-access memory DRAM (e.g., HBM) and the second memory is a NVM. In one implementation, a runtime manager prioritizes having activation buffers that will be accessed by a current layer and one or more subsequent layers of the neural network in the first memory for better performance when training the neural network. After block 1715, method 1700 ends.

In various implementations, program instructions of a software application are used to implement the methods and/or mechanisms described herein. For example, program instructions executable by a general or special purpose processor are contemplated. In various implementations, such program instructions can be represented by a high level programming language. In other implementations, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:

a processor comprising circuitry; and wherein the processor is configured to manage buffer transfers between a first memory device and a second memory device during training of a neural network comprising a plurality of layers;

wherein during a forward propagation pass of the neural network, the processor is configured to:

during processing of a first layer of the neural network:

allocate space in the second memory device for each buffer used as either an input or an output during processing of a first layer of the plurality of layers;

store an identification of a first buffer to be transferred from the second memory device to the first memory device, in response to detecting the first buffer is used as an input during processing of the first layer; and during processing of a second layer of the neural network, reserve space used by the first buffer in the second memory device for use in storing an output of the second layer, without allocating new space for the output of the second layer.

2. The system as recited in claim 1, wherein the first memory device has a lower bandwidth than the second memory device.

3. The system as recited in claim 1, wherein the processor is configured to transfer the first buffer from the second memory device to the first memory device in further response to transfer of the first buffer having not yet been completed.

4. The system as recited in claim 3, wherein the processor is configured to store the identification of the first buffer to be transferred from the second memory device to the first memory device in a first data structure.

5. The system as recited in claim 4, wherein the first data structure comprises a plurality of entries with each of the plurality of entries being configured to store an identification of a given buffer and an indication as to whether transfer of the given buffer has been completed.

6. The system as recited in claim 5, wherein the processor is configured to transfer the first buffer from the second memory device to the first memory device in further response to an occupancy level of the second memory device being above a threshold.

7. The system as recited in claim 1, wherein the processor is configured to generate a classification based on the neural network.

8. A method comprising:

managing buffer transfers between a first memory device and a second memory device during training of a neural network comprising a plurality of layers during a forward propagation pass of the neural network:

during processing of a first layer of the neural network:

allocating space in the second memory device for each buffer used as either an input or an output during processing of a current layer of a first layer of the plurality of layers;

storing an identification of a first buffer to be transferred from the second memory device to the first memory device, in response to detecting the first buffer is used as an input during processing of the first layer; and during processing of a second layer of the plurality of layers of the neural network, reserving space used by the first buffer in the second memory for use in storing an output of the second layer, without allocating new space for the output of the second layer.

9. The method as recited in claim 8, wherein the first memory device has a lower bandwidth than the second memory device.

10. The method as recited in claim 8, further comprising transferring the first buffer from the second memory device to the first memory device in further response to transfer of the first buffer having not yet been completed.

11. The method as recited in claim 10, further comprising storing the identification of the first buffer to be transferred from the second memory device to the first memory device in a first data structure.

12. The method as recited in claim 11, wherein the first data structure comprises a plurality of entries with each of the plurality of entries being configured to store an identification of a given buffer and an indication as to whether transfer of the given buffer has been completed.

13. The method as recited in claim 12, further comprising transferring the first buffer from the second memory device to the first memory device in further response to an occupancy level of the second memory device being above a threshold.

14. The method as recited in claim 8, further comprising generating a classification based on the neural network.

15. An apparatus comprising:

a first processor comprising circuitry configured to execute a runtime manager; and a second processor comprising circuitry configured to execute a neural network comprising a plurality of executable layers;

wherein when executed by the first processor, the runtime manager is configured to:

manage buffer transfers between a first memory device and a second memory device during training of a neural network comprising a plurality of layers;

during a forward propagation pass of the neural network:

during processing of a first layer of the neural network:

allocate space in the second memory device for each buffer used as either an input or an output during processing of a current layer of the plurality of layers;

store an identification of a first buffer to be transferred from the second memory device to the first memory device, in response to detecting the first buffer is used as an input during processing of the first layer; and during processing of a second layer of the plurality of layers of the neural network, reserve space used by the first buffer in the second memory device for use in storing an output of the second layer, without allocating new space for the output of the second layer.

16. The apparatus as recited in claim 15, wherein the first memory device has a lower bandwidth than the second memory device.

17. The apparatus as recited in claim 16, wherein when executed by the first processor, the runtime manager is further configured to transfer the first buffer from the second memory device to the first memory device in further response to transfer of the first buffer having not yet been completed.

18. The apparatus as recited in claim 15, wherein the runtime manager is configured to store the identification of the first buffer to be transferred from the second memory device to the first memory device in a first data structure.

19. The apparatus as recited in claim 18, wherein the first data structure comprises a plurality of entries with each of the plurality of entries being configured to store an identification of a given buffer and an indication as to whether transfer of the given buffer has been completed.

20. The apparatus as recited in claim 19, wherein when executed by the first processor, the runtime manager is further configured to cause a kernel to stall if the kernel is issued for execution and there is not enough free capacity in the first memory device to store a buffer.

* * * * *